United States Patent
Shveidel et al.

(10) Patent No.: US 12,164,770 B2
(45) Date of Patent: Dec. 10, 2024

(54) CACHING TECHNIQUES USING A UNIFIED CACHE OF METADATA LEAF OBJECTS WITH MIXED POINTER TYPES AND LAZY CONTENT RESOLUTION

(71) Applicant: Dell Products L.P., Hopkinton, MA (US)

(72) Inventors: Vladimir Shveidel, Pardes-Hana (IL); Vamsi K Vankamamidi, Hopkinton, MA (US); Amitai Alkalay, Kadima (IL)

(73) Assignee: Dell Products L.P., Hopkinton, MA (US)

( * ) Notice: Subject to any disclaimer, the term of this patent is extended or adjusted under 35 U.S.C. 154(b) by 75 days.

(21) Appl. No.: 18/125,381

(22) Filed: Mar. 23, 2023

(65) Prior Publication Data

US 2024/0319876 A1    Sep. 26, 2024

(51) Int. Cl.
*G06F 12/00* (2006.01)
*G06F 3/06* (2006.01)
(Continued)

(52) U.S. Cl.
CPC ............ *G06F 3/061* (2013.01); *G06F 3/0655* (2013.01); *G06F 3/0679* (2013.01); *G06F 12/0802* (2013.01); *G06F 16/24552* (2019.01)

(58) Field of Classification Search
CPC .. G06F 3/061; G06F 16/24552; G06F 3/0655; G06F 3/0679; G06F 12/0802
See application file for complete search history.

(56) References Cited

U.S. PATENT DOCUMENTS 9,400,741 B1 *   7/2016   Bono ..................... G06F 3/0611
11,513,968 B1 *  11/2022  Sullivan .............. G06F 12/0842
(Continued)

OTHER PUBLICATIONS

U.S. Appl. No. 18/071,798, filed Nov. 30, 2022, entitled Caching Techniques Using a Two-Level Read Cache, to Vladimir Shveidel, et al.
(Continued)

*Primary Examiner* — David Yi
*Assistant Examiner* — Tahilba O Puche
(74) *Attorney, Agent, or Firm* — Muirhead and Saturnelli, LLC

(57) ABSTRACT

Techniques for processing a read I/O operation directed to a logical address LA1 can include: determining a logical address range R1 including LA1; determining whether a unified cache includes a cached object corresponding to R1; and responsive to determining that the unified cache does not include a cached object corresponding to R1, determining a unified cache miss with respect to R1 and performing unified cache miss processing including: traversing metadata pages, including a metadata leaf page, corresponding to LA1; storing indirect pointers from entries of the metadata leaf page to corresponding entries of a new metadata leaf object of the unified cache corresponding to R1; performing processing using an indirect pointer of an entry of the new metadata leaf object, where the entry corresponds to LA1 and the processing includes retrieving the content of LA1 using the indirect pointer; and returning the content in response to the read I/O operation.

19 Claims, 16 Drawing Sheets

(51) Int. Cl.
*G06F 12/0802* (2016.01)
*G06F 16/2455* (2019.01)

(56) References Cited

U.S. PATENT DOCUMENTS

| | | | | |
|---|---|---|---|---|
| 2009/0222625 | A1* | 9/2009 | Ghosh | G06F 9/383 |
| | | | | 711/3 |
| 2010/0293332 | A1* | 11/2010 | Krishnaprasad | G06F 12/0813 |
| | | | | 711/119 |
| 2011/0029570 | A1* | 2/2011 | Pretorius | G06F 16/2246 |
| | | | | 707/E17.014 |
| 2013/0297613 | A1* | 11/2013 | Yu | G06F 16/9027 |
| | | | | 707/E17.014 |
| 2015/0278093 | A1* | 10/2015 | O'Krafka | G06F 12/0873 |
| | | | | 711/122 |
| 2015/0278283 | A1* | 10/2015 | O'Krafka | G06F 16/2246 |
| | | | | 707/609 |
| 2019/0205255 | A1* | 7/2019 | Hansen | G06F 12/0891 |
| 2019/0236016 | A1* | 8/2019 | Jawahar | G06F 12/0888 |
| 2021/0034235 | A1* | 2/2021 | Kucherov | G06F 13/20 |
| 2021/0064527 | A1* | 3/2021 | Huang | G06F 12/123 |
| 2022/0229777 | A1 | 7/2022 | Shveidel et al. | |
| 2023/0026819 | A1* | 1/2023 | Love | G06F 12/0804 |
| 2023/0229332 | A1* | 7/2023 | Shveidel | G06F 3/061 |
| | | | | 711/153 |

OTHER PUBLICATIONS

U.S. Appl. No. 18/160,404, filed Jan. 27, 2023, entitled System and Method for Managing Data Portion Ownership in a Storage Cluster, to Vladimir Shveidel, et al.

U.S. Appl. No. 18/118,946, filed Mar. 8, 2023, entitled Caching Techniques Using a Mapping Cache and Maintaining Cache Coherency Using Hash Values, to Ashok Tamilarasan, et al.

* cited by examiner

CACHING TECHNIQUES USING A UNIFIED CACHE OF METADATA LEAF OBJECTS WITH MIXED POINTER TYPES AND LAZY CONTENT RESOLUTION

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O operations, such as data read and write operations, that are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY OF THE PRESENT DISCLOSURE

Various embodiments of the techniques herein can include a computer-implemented method, a system and a non-transitory computer readable medium. The system can include one or more processors, and a memory comprising code that, when executed, performs the method. The non-transitory computer readable medium can include code stored thereon that, when executed, performs the method. The method can comprise: receiving a read I/O operation requesting first content from a first logical address LA1; determining a first logical address range R1 including LA1; determining whether a unified cache of metadata (MD) leaf objects includes any cached MD leaf object corresponding to R1; and responsive to determining that the unified cache does not include any cached MD leaf object corresponding to R1, determining a unified cache miss with respect to R1 and performing unified cache miss processing including: traversing mapping information of a plurality of MD pages, wherein the mapping information is used to map LA1 to a corresponding physical address PA1 storing the first content of LA1, wherein the plurality of MD pages includes a first MD leaf page and wherein said traversing stops at said first MD leaf page; creating a first cached MD leaf object corresponding to R1; storing indirect pointers from entries of the first MD leaf page to corresponding entries of the first cached MD leaf object; performing first processing using a first indirect pointer of a first entry of the first cached MD leaf object, where the first entry corresponds to LA1, wherein said first processing includes retrieving the first content of LA1 using the first indirect pointer; and responsive to said first processing, returning the first content in response to the read I/O operation.

In at least one embodiment, R1 can have a starting logical address S1, and wherein said determining whether the unified cache of metadata (MD) leaf objects includes any cached MD leaf object corresponding to R1 can further include: mapping S1 to a corresponding index or entry I1 of the unified cache; and determining whether the corresponding index or entry I1 of the unified cache is associated with any cached MD leaf object corresponding to R1. The mapping can include applying a hash function H to S1, where H(S1)=I1. The unified cache can be implemented as a hash table using starting logical addresses of corresponding logical address ranges of cached MD leaf objects as keys, and wherein each of the keys associated with one of the corresponding logical address ranges can be mapped to a corresponding cached MD leaf object including entries associated with said one corresponding logical address range.

In at least one embodiment, the first processing can include using a second cache, wherein the second cache can use indirect pointers as keys which are mapped to corresponding content stored at logical addresses. The first processing can include: querying the second cache using the first indirect pointer as a key or index to determine whether the second cache includes a second entry corresponding to the first indirect pointer; and responsive to determining that the second cache includes a second entry corresponding to the first indirect pointer, retrieving the first content associated with the second entry of the second cache. The first processing can include: responsive to determining that the second cache does not include any entry corresponding to the first indirect pointer, determining a second cache miss and performing second cache miss processing comprising: performing first resolution processing using the first indirect pointer to obtain PA1; retrieving the first content from PA1; and updating the first entry of the first cached MD leaf object to include PA1. The first indirect pointer can be an address of a virtual layer block (VLB) entry of a VLB structure. The VLB entry can include PA1. The first resolution processing can include using the first indirect pointer to read the VLB entry including PA1. Updating the first entry of the first cached MD leaf object to include PA1 can further include setting a flag associated with the first entry to denote a pointer type indicating a physical address or location of content or user data stored on backend non-volatile storage.

In at least one embodiment, storing indirect pointers from entries of the first MD leaf page to corresponding entries of the first cached MD leaf object can include setting flags corresponding to entries of the first cache MD leaf object to denote a pointer type indicating an indirect pointer to content or user data stored on backend non-volatile storage.

In at least one embodiment, processing can include: receiving a second read I/O operation requesting second content from a second logical address LA2; determining R1 includes LA2; determining that the unified cache includes the first MD leaf object corresponding to R1; responsive to determining that the unified cache includes the first MD leaf object corresponding to R1, determining a unified cache hit with respect to R1 and performing unified cache hit processing including: determining that the first MD leaf object of the unified cache includes a second entry corresponding to LA2; using a second indirect pointer of the second entry of the first MD leaf object to obtain the second content; and returning the second content in response to the second read I/O operation. The unified cache hit processing can include: querying a second cache using the second indirect pointer as a key or index to determine whether the second cache includes a third entry corresponding to the second indirect pointer; and responsive to determining that the second cache includes the third entry corresponding to the second indirect pointer, retrieving the second content associated with the third entry of the second cache. The unified cache hit processing can include: querying a second cache using the second indirect pointer as a key or index to determine whether the second cache includes any entry corresponding to the second indirect pointer; and responsive to determining that the second cache does not include any entry corresponding to the second indirect pointer, determining a second cache miss and performing second cache miss processing comprising: performing first resolution processing using the second indirect pointer to obtain a second physical address PA2; retrieving the second content from PA2; and updating the second entry of the first cached MD leaf object to include PA2.

In at least one embodiment, the first cached MD leaf object can include a plurality of entries, where each of the plurality of entries can be uniquely associated with a single logical address in R1. Each of the plurality of entries can include a pointer or address which is one of a plurality of defined pointer types. A particular one of the plurality of defined pointer types associated with said each entry can be denoted by a bit setting in a pointer field of said each entry. The bit setting can be a setting of a most significant bit of the pointer field of said each entry.

BRIEF DESCRIPTION OF THE DRAWINGS

Features and advantages of the present disclosure will become more apparent from the following detailed description of exemplary embodiments thereof taken in conjunction with the accompanying drawings in which.

Figure 1:
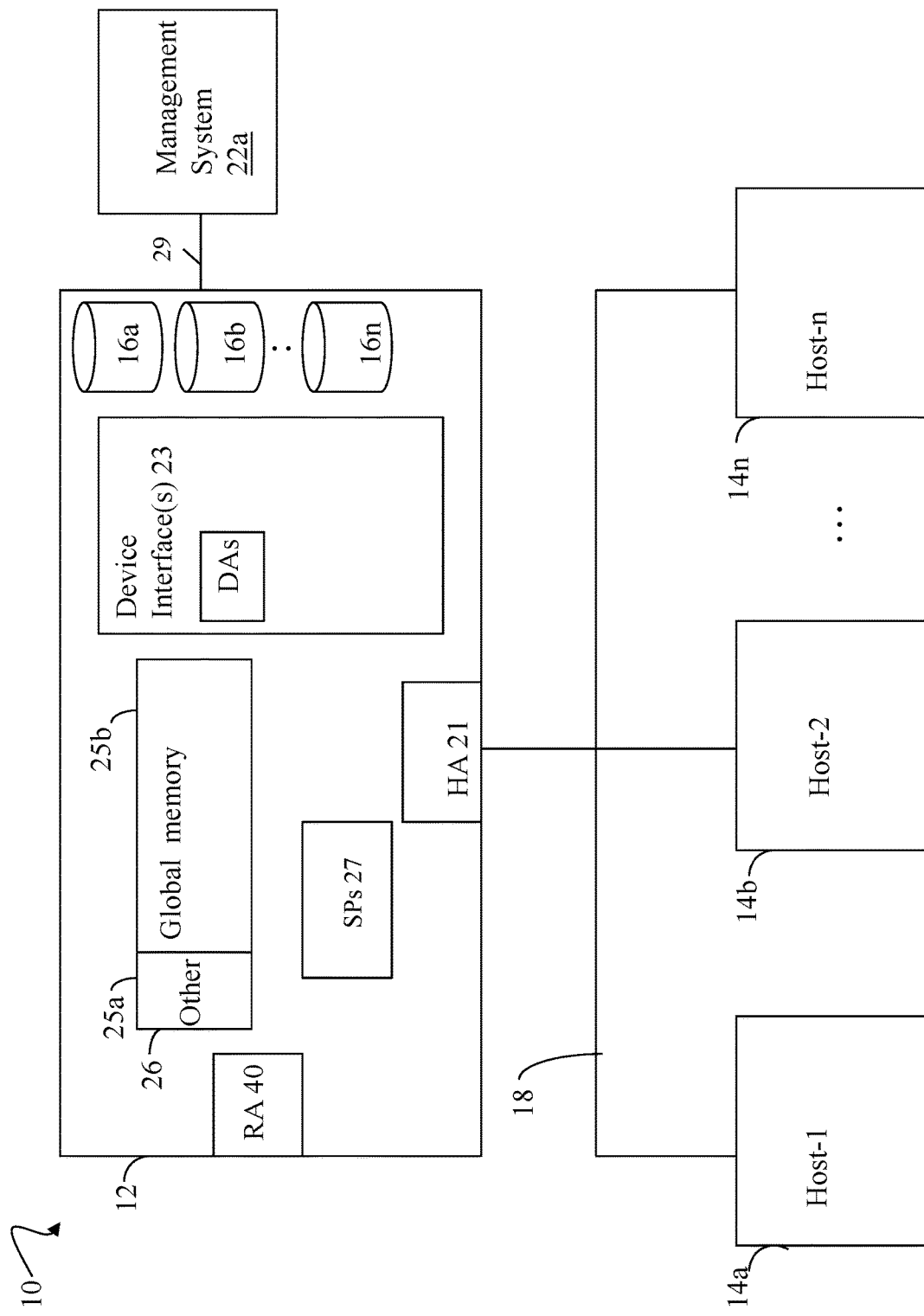
FIG. 1 is an example of components that may be included in a system in accordance with the techniques of the present disclosure.

DETAILED DESCRIPTION OF
EMBODIMENT(S)

Existing systems, such as data storage systems, can maintain and utilize a data cache to store frequently accessed pages of data. The data cache can be, for example, a form of fast volatile memory such as a volatile form of random access memory (RAM). In particular, the data cache can be used as a read data cache to store user data which is frequently read. For a read I/O requesting read data, the read data which is stored in the cache results in a cache hit or read cache hit. For a read cache hit, the requested read data can be retrieved from the cache and returned to the requester or originator of the read I/O. If the requested read data is not in the cache, a cache miss or read cache miss results where the requested read data can be retrieved from longer term backend (BE) non-volatile storage. A cache miss as compared to a cache hit results in an I/O performance penalty and increased I/O latency in order to service the read I/O and return the requested read data to the requester. The data cache can provide for read cache hits and optimized performance such as by providing for improved I/O latency and improved utilization of system resources. Generally, the data cache, and cache memory in general, can be characterized as a critical and expensive resource which can have a limited size or capacity. Accordingly, it is important for systems to utilize the data cache, and more generally cache storage, efficiently to provide for optimal performance.

In at least one existing system, mapping information can be used to map a logical address to a corresponding physical storage location or address storing the user data or content of the logical address. The mapping information can be a chain of metadata (MD) pages traversed to obtain the content of a logical address from its corresponding physical storage location or address on BE non-volatile storage. Thus, a read cache miss with respect to a read I/O requesting to read user data from a logical address can result in a cache miss with respect to the data cache noted above. Read cache miss processing can incur a performance penalty as noted above, at least in part, due to the traversal of the chain of MD pages of the mapping information. The MD pages of mapping information can also be stored on BE non-volatile storage. Thus, traversing the chain of MD page can include retrieving each MD page of the chain from BE non-volatile storage thereby incurring additional performance penalties to access. To further improve performance, a system can also store the mapping information, such as the chain of MD pages, in the cache. However, as with the user data and the limited size of the cache, not all mapping information or MD pages for all user data can be stored in the cache. As a result, accessing the multiple layers or levels of MD pages which can be needed for accessing the read data to service a read cache miss can result in additional cache misses thereby incurring an additional performance penalty to access any uncached MD pages of mapping information from BE non-volatile storage.

Even if all MD pages of mapping information needed for a currently active user data set are in cache, traversing the chain of cached MD pages of mapping information still incurs undesirable CPU resource usage. As a result, further techniques can be used to improve performance and reduce I/O latency. For example, one or more entry-based shortcut MD caches can be used in combination with a page-based MD cache. The shortcut MD cache can generally provide for reducing the logical address to physical address resolution processing using the chain of MD pages such as by bypassing at least a portion of the chain of MD pages. The shortcut MD cache can be, for example, an entry-based cache indexed by logical address of user data. In some systems, the shortcut MD cache can be used in combination with a MD page cache which is page-based and indexed by a unique identifier or address associated with a MD page.

Use of both types of MD caches—the shortcut MD page and regular MD page cache—can improve performance and I/O latency. However, the foregoing can have some weaknesses and drawbacks.

One drawback is that the shortcut MD cache may not be optimized for sequential reads of user data logical addresses. Each logical address of a sequential read I/O pattern can require a separate query or lookup in the entry-based shortcut MD cache. Also, an entry-based MD cache, where there is a single cached entry per logical address as the key, can generally be expensive in terms of both capacity and performance. Another drawback is that the two types of MD caches noted above can be maintained concurrently requiring associated overhead in such maintenance. The two types of MD cache can also operate independently of one another so that, for example, there may be no synchronization regarding the content of the two MD caches. In some cases, there can be similar or duplicate content cached in the two types of caches. For example, with one type of shortcut MD cache, the content of the shortcut MD cache can be similar to content which is cached in the regular MD page cache for a particular type of MD page (e.g., where there is at least some duplicate cached content as between the shortcut MD cache and the regular MD page cache). Also, at least one type of shortcut MD cache, which uses a logical address as the index or key that is mapped to cached content or data stored at the logical address, may not support deduplication. As a result, the same data or content can be stored in multiple cache lines for different logical addresses.

Accordingly, described in the present disclosure are techniques that overcome the foregoing drawbacks and provide for improved and efficient use of the cache. The techniques of the present disclosure provide for maintaining and utilizing a page-based MD cache. In at least one embodiment, the page-based MD cache can be referred to as a unified cache or hybrid cache used for caching MD leaf objects. Each of the MD leaf objects can be a cached object which is similar to a regular MD leaf page of a chain of MD pages of mapping information with a difference that the entries of a cached MD leaf object of the unified cache can include multiple types of pointers or addresses. In at least one embodiment, regular MD leaf pages can only include a single type of pointer or address.

The techniques of the present disclosure provide for on-demand updating of pointers or addresses of the cached MD leaf object of the unified cache. Such updating can include modifying entries of the cached MD leaf object as read I/O operations are performed to access corresponding logical addresses for such modified entries. Such updating can include modifying an entry of the cached MD leaf object corresponding to a logical address from a first pointer or address having a first type to a second pointer or address having a second type. The first pointer can be an indirect pointer used to indirectly access content stored at a logical address corresponding to the entry which includes the first pointer. The second pointer can be a pointer or address used to directly access the content stored at the logical address corresponding to the entry which includes the second pointer. Entries of the cached MD leaf object including pointers or addresses of the first type and second type can be used to retrieve requested user data or content of a logical address.

The foregoing and other aspects of the techniques of the present disclosure are described in more detail in the following paragraphs.

Referring to the FIG. 1, shown is an example of an embodiment of a SAN 10 that is used in connection with performing the techniques described herein. The SAN 10 includes a data storage system 12 connected to the host systems (also sometimes referred to as hosts) 14a-14n through the communication medium 18. In this embodiment of the SAN 10, the n hosts 14a-14n access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, a network, or other wireless or other hardwired connection(s) by which the host systems 14a-14n access and communicate with the data storage system 12, and also communicate with other components included in the SAN 10.

Each of the host systems 14a-14n and the data storage system 12 included in the SAN 10 are connected to the communication medium 18 by any one of a variety of connections as provided and supported in accordance with the type of communication medium 18. The processors included in the host systems 14a-14n and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software included in the data storage system 12 are described herein in more detail, and can vary with each particular embodiment. Each of the hosts 14a-14n and the data storage system 12 can all be located at the same physical site, or, alternatively, be located in different physical locations. The communication medium 18 used for communication between the host systems 14a-14n and the data storage system 12 of the SAN 10 can use a variety of different communication protocols such as block-based protocols (e.g., SCSI, FC, iSCSI), file system-based protocols (e.g., NFS or network file server), and the like. Some or all of the connections by which the hosts 14a-14n and the data storage system 12 are connected to the communication medium 18 can pass through other communication devices, such as switching equipment, a phone line, a repeater, a multiplexer or even a satellite.

Each of the host systems 14a-14n can perform data operations. In the embodiment of the FIG. 1, any one of the host computers 14a-14n issues a data request to the data storage system 12 to perform a data operation. For example, an application executing on one of the host computers 14a-14n performs a read or write operation resulting in one or more data requests to the data storage system 12.

It should be noted that although the element 12 is illustrated as a single data storage system, such as a single data storage array, the element 12 also represents, for example, multiple data storage arrays alone, or in combination with, other data storage devices, systems, appliances, and/or components having suitable connectivity to the SAN 10 in an embodiment using the techniques herein. It should also be noted that an embodiment can include data storage arrays or other components from one or more vendors. In subsequent examples illustrating the techniques herein, reference is made to a single data storage array by a vendor. However, as will be appreciated by those skilled in the art, the techniques herein are applicable for use with other data storage arrays by other vendors and with other components than as described herein for purposes of example.

In at least one embodiment, the data storage system 12 is a data storage appliance or a data storage array including a plurality of data storage devices (PDs) 16a-16n. The data storage devices 16a-16n include one or more types of data storage devices such as, for example, one or more rotating disk drives and/or one or more solid state drives (SSDs). An SSD is a data storage device that uses solid-state memory to store persistent data. SSDs refer to solid state electronics devices as distinguished from electromechanical devices, such as hard drives, having moving parts. Flash devices or flash memory-based SSDs are one type of SSD that contains no moving mechanical parts. In at least one embodiment, the flash devices can be constructed using nonvolatile semiconductor NAND flash memory. The flash devices include, for example, one or more SLC (single level cell) devices and/or MLC (multi level cell) devices.

In at least one embodiment, the data storage system or array includes different types of controllers, adapters or directors, such as an HA 21 (host adapter), RA 40 (remote adapter), and/or device interface(s) 23. Each of the adapters (sometimes also known as controllers, directors or interface components) can be implemented using hardware including a processor with a local memory with code stored thereon for execution in connection with performing different operations. The HAs are used to manage communications and data operations between one or more host systems and the global memory (GM). In an embodiment, the HA is a Fibre Channel Adapter (FA) or other adapter which facilitates host communication. The HA 21 can be characterized as a front end component of the data storage system which receives a request from one of the hosts 14a-n. In at least one embodiment, the data storage array or system includes one or more RAs used, for example, to facilitate communications between data storage arrays. The data storage array also includes one or more device interfaces 23 for facilitating data transfers to/from the data storage devices 16a-16n. The data storage device interfaces 23 include device interface modules, for example, one or more disk adapters (DAs) (e.g., disk controllers) for interfacing with the flash drives or other physical storage devices (e.g., PDS 16a-n). The DAs can also be characterized as back end components of the data storage system which interface with the physical data storage devices.

One or more internal logical communication paths exist between the device interfaces 23, the RAs 40, the HAs 21, and the memory 26. An embodiment, for example, uses one or more internal busses and/or communication modules. In at least one embodiment, the global memory portion 25b is used to facilitate data transfers and other communications between the device interfaces, the HAs and/or the RAs in a data storage array. In one embodiment, the device interfaces 23 performs data operations using a system cache included in the global memory 25b, for example, when communicating with other device interfaces and other components of the data storage array. The other portion 25a is that portion of the memory used in connection with other designations that can vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, can also be included in an embodiment.

The host systems 14a-14n provide data and access control information through channels to the storage systems 12, and the storage systems 12 also provide data to the host systems 14a-n also through the channels. The host systems 14a-n do not address the drives or devices 16a-16n of the storage systems directly, but rather access to data is provided to one or more host systems from what the host systems view as a plurality of logical devices, logical volumes (LVs) also referred to herein as logical units (e.g., LUNs). A logical unit (LUN) can be characterized as a disk array or data storage system reference to an amount of storage space that has been formatted and allocated for use to one or more hosts. A logical unit has a logical unit number that is an I/O address for the logical unit. As used herein, a LUN or LUNs refers to the different logical units of storage referenced by such logical unit numbers. The LUNs have storage provisioned from portions of one or more physical disk drives or more generally physical storage devices. For example, one or more LUNs can reside on a single physical disk drive, data of a single LUN can reside on multiple different physical devices, and the like. Data in a single data storage system, such as a single data storage array, can be accessible to multiple hosts allowing the hosts to share the data residing therein. The HAs are used in connection with communications between a data storage array and a host system. The RAs are used in facilitating communications between two data storage arrays. The DAs include one or more types of device interfaced used in connection with facilitating data transfers to/from the associated disk drive(s) and LUN (s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques herein, the data storage system as described can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques herein are made with respect to a physical data storage system and its physical components (e.g., physical hardware for each HA, DA, HA port and the like), the techniques herein can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a used to manage and monitor the data storage system 12. In one embodiment, the management system 22a is a computer system which includes data storage system management software or application that executes in a web browser. A data storage system manager can, for example, view information about a current data storage configuration such as LUNs, storage pools, and the like, on a user interface (UI) in a display device of the management system 22a. Alternatively, and more generally, the management software can execute on any suitable processor in any suitable system. For example, the data storage system management software can execute on a processor of the data storage system 12.

Information regarding the data storage system configuration is stored in any suitable data container, such as a database. The data storage system configuration information stored in the database generally describes the various physical and logical entities in the current data storage system configuration. The data storage system configuration information describes, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, data storage system performance information such as regarding various storage objects and other entities in the system, and the like.

Consistent with other discussion herein, management commands issued over the control or management path include commands that query or read selected portions of the data storage system configuration, such as information regarding the properties or attributes of one or more LUNs. The management commands also include commands that write, update, or modify the data storage system configuration, such as, for example, to create or provision a new LUN (e.g., which result in modifying one or more database tables such as to add information for the new LUN), and the like.

It should be noted that each of the different controllers or adapters, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16a-16n. In the following description, data residing on a LUN is accessed by the device interface following a data request in connection with I/O operations. For example, a host issues an I/O operation that is received by the HA 21. The I/O operation identifies a target location from which data is read from, or written to, depending on whether the I/O operation is, respectively, a read or a write operation request. In at least one embodiment using block storage services, the target location of the received I/O operation is expressed in terms of a LUN and logical address or offset location (e.g., LBA or logical block address) on the LUN. Processing is performed on the data storage system to further map the target location of the received I/O operation, expressed in terms of a LUN and logical address or offset location on the LUN, to its corresponding physical storage device (PD) and location on the PD. The DA which services the particular PD performs processing to either read data from, or write data to, the corresponding physical device location for the I/O operation.

It should be noted that an embodiment of a data storage system can include components having different names from that described herein but which perform functions similar to components as described herein. Additionally, components within a single data storage system, and also between data storage systems, can communicate using any suitable technique described herein for exemplary purposes. For example, the element 12 of the FIG. 1 in one embodiment is a data storage system, such as a data storage array, that includes multiple storage processors (SPs). Each of the SPs 27 is a CPU including one or more "cores" or processors and each have their own memory used for communication between the different front end and back end components rather than utilize a global memory accessible to all storage processors. In such embodiments, the memory 26 represents memory of each such storage processor.

Generally, the techniques herein can be used in connection with any suitable storage system, appliance, device, and the like, in which data is stored. For example, an embodiment can implement the techniques herein using a midrange data storage system as well as a higher end or enterprise data storage system.

The data path or I/O path can be characterized as the path or flow of I/O data through a system. For example, the data or I/O path can be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system. For example, the control or management path is the logical flow through hardware and software components or layers in connection with issuing data storage management command to and/or from a data storage system, and also receiving responses (possibly including requested data) to such control or management commands. For example, with reference to the FIG. 1, the control commands are issued from data storage management software executing on the management system 22a to the data storage system 12. Such commands, for example, establish or modify data services, provision storage, perform user account management, and the like. Consistent with other discussion herein, management commands result in processing that can include reading and/or modifying information in the database storing data storage system configuration information.

The data path and control path define two sets of different logical flow paths. In at least some of the data storage system configurations, at least part of the hardware and network connections used for each of the data path and control path differ. For example, although both control path and data path generally use a network for communications, some of the hardware and software used can differ. For example, with reference to the FIG. 1, a data storage system has a separate physical connection 29 from a management system 22a to the data storage system 12 being managed whereby control commands are issued over such a physical connection 29. However, user I/O commands are never issued over such a physical connection 29 provided solely for purposes of connecting the management system to the data storage system. In any case, the data path and control path each define two separate logical flow paths.

Figure 2A:
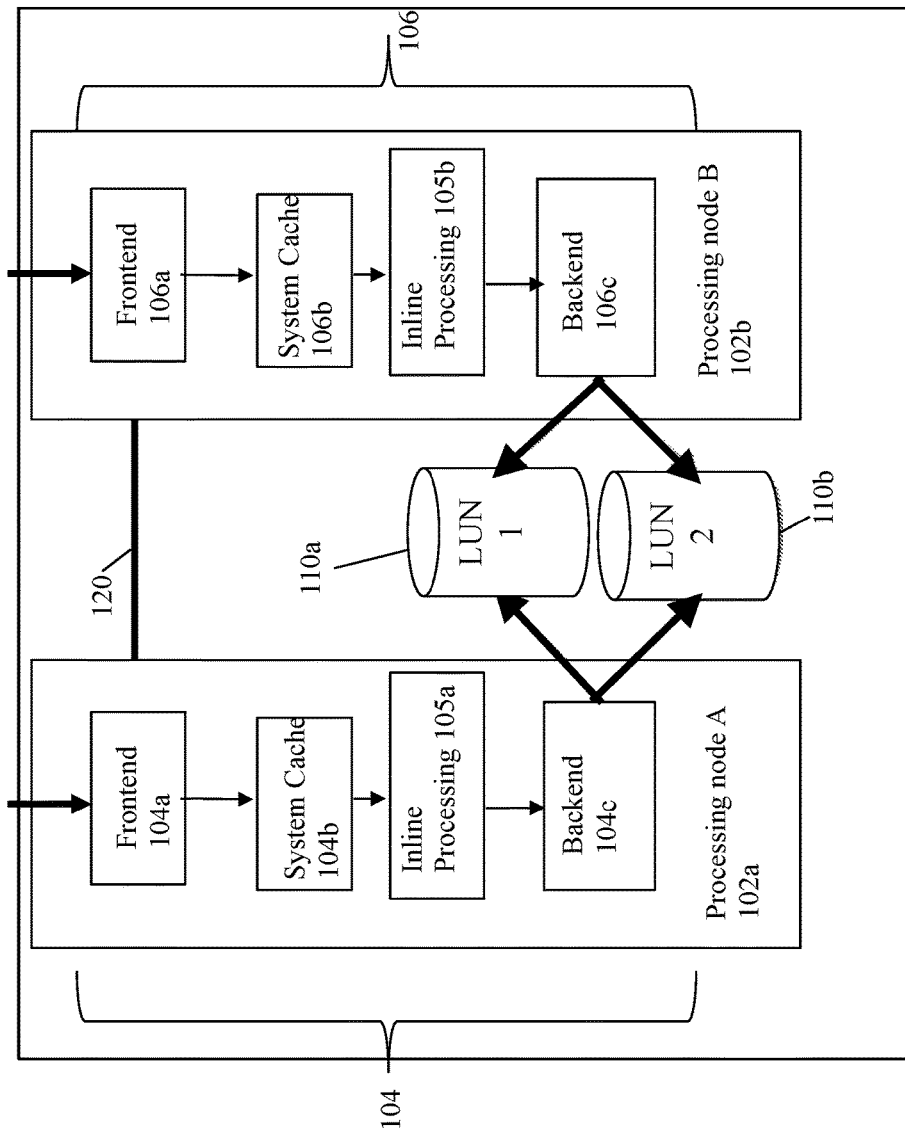
FIG. 2A is an example illustrating the I/O path or data path in connection with processing data in at least one embodiment in accordance with the techniques of the present disclosure.

With reference to the FIG. 2A, shown is an example 100 illustrating components that can be included in the data path in at least one existing data storage system in accordance with the techniques of the present disclosure. The example 100 includes two processing nodes A 102a and B 102b and the associated software stacks 104, 106 of the data path, where I/O requests can be received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104*b* where data is temporarily stored; an inline processing layer 105*a*; and a backend (BE) component 104*c* that facilitates movement of the data between the system cache and non-volatile physical storage (e.g., back end physical non-volatile storage devices or PDs accessed by BE components such as DAs as described herein). During movement of data in and out of the system cache layer 104*b* (e.g., such as in connection with read data from, and writing data to, physical storage 110*a*, 110*b*), inline processing can be performed by layer 105*a*. Such inline processing operations of 105*a* can be optionally performed and can include any one of more data processing operations in connection with data that is flushed from system cache layer 104*b* to the back-end non-volatile physical storage 110*a*, 110*b*, as well as when retrieving data from the back-end non-volatile physical storage 110*a*, 110*b* to be stored in the system cache layer 104*b*. In at least one embodiment, the inline processing can include, for example, performing one or more data reduction operations such as data deduplication or data compression. The inline processing can include performing any suitable or desirable data processing operations as part of the I/O or data path.

In a manner similar to that as described for data path 104, the data path 106 for processing node B 102*b* has its own FE component 106*a*, system cache layer 106*b*, inline processing layer 105*b*, and BE component 106*c* that are respectively similar to the components 104*a*, 104*b*, 105*a* and 104*c*. The elements 110*a*, 110*b* denote the non-volatile BE physical storage provisioned from PDs for the LUNs, whereby an I/O can be directed to a location or logical address of a LUN and where data can be read from, or written to, the logical address. The LUNs 110*a*, 110*b* are examples of storage objects representing logical storage entities included in an existing data storage system configuration. Since, in this example, writes, or more generally I/Os, directed to the LUNs 110*a*, 110*b* can be received for processing by either of the nodes 102*a* and 102*b*, the example 100 illustrates what can also be referred to as an active-active configuration.

In connection with a write operation received from a host and processed by the processing node A 102*a*, the write data can be written to the system cache 104*b*, marked as write pending (WP) denoting it needs to be written to the physical storage 110*a*, 110*b* and, at a later point in time, the write data can be destaged or flushed from the system cache to the physical storage 110*a*, 110*b* by the BE component 104*c*. The write request can be considered complete once the write data has been stored in the system cache whereby an acknowledgement regarding the completion can be returned to the host (e.g., by component the 104*a*). At various points in time, the WP data stored in the system cache is flushed or written out to the physical storage 110*a*, 110*b*.

In connection with the inline processing layer 105*a*, prior to storing the original data on the physical storage 110*a*, 110*b*, one or more data reduction operations can be performed. For example, the inline processing can include performing data compression processing, data deduplication processing, and the like, that can convert the original data (as stored in the system cache prior to inline processing) to a resulting representation or form which is then written to the physical storage 110*a*, 110*b*.

In connection with a read operation to read a block of data, a determination is made as to whether the requested read data block is stored in its original form (in system cache 104*b* or on physical storage 110*a*, 110*b*), or whether the requested read data block is stored in a different modified form or representation. If the requested read data block (which is stored in its original form) is in the system cache, the read data block is retrieved from the system cache 104*b* and returned to the host. Otherwise, if the requested read data block is not in the system cache 104*b* but is stored on the physical storage 110*a*, 110*b* in its original form, the requested data block is read by the BE component 104*c* from the backend storage 110*a*, 110*b*, stored in the system cache and then returned to the host.

If the requested read data block is not stored in its original form, the original form of the read data block is recreated and stored in the system cache in its original form so that it can be returned to the host. Thus, requested read data stored on physical storage 110*a*, 110*b* can be stored in a modified form where processing is performed by 105*a* to restore or convert the modified form of the data to its original data form prior to returning the requested read data to the host.

Also illustrated in FIG. 2A is an internal network interconnect 120 between the nodes 102*a*, 102*b*. In at least one embodiment, the interconnect 120 can be used for internode communication between the nodes 102*a*, 102*b*.

In connection with at least one embodiment in accordance with the techniques of the present disclosure, each processor or CPU can include its own private dedicated CPU cache (also sometimes referred to as processor cache) that is not shared with other processors. In at least one embodiment, the CPU cache, as in general with cache memory, can be a form of fast memory (relatively faster than main memory which can be a form of RAM). In at least one embodiment, the CPU or processor cache is on the same die or chip as the processor and typically, like cache memory in general, is far more expensive to produce than normal RAM used as main memory. The processor cache can be substantially faster than the system RAM used as main memory. The processor cache can contain information that the processor will be immediately and repeatedly accessing. The faster memory of the CPU cache can for example, run at a refresh rate that's closer to the CPU's clock speed, which minimizes wasted cycles. In at least one embodiment, there can be two or more levels (e.g., L1, L2 and L3) of cache. The CPU or processor cache can include at least an L1 level cache that is the local or private CPU cache dedicated for use only by that particular processor. The two or more levels of cache in a system can also include at least one other level of cache (LLC or lower level cache) that is shared among the different CPUs. The L1 level cache serving as the dedicated CPU cache of a processor can be the closest of all cache levels (e.g., L1-L3) to the processor which stores copies of the data from frequently used main memory locations. Thus, the system cache as described herein can include the CPU cache (e.g., the L1 level cache or dedicated private CPU/processor cache) as well as other cache levels (e.g., the LLC) as described herein. Portions of the LLC can be used, for example, to initially cache write data which is then flushed to the backend physical storage such as BE PDs providing non-volatile storage. For example, in at least one embodiment, a RAM based memory can be one of the caching layers used as to cache the write data that is then flushed to the backend physical storage. When the processor performs processing, such as in connection with the inline processing 105*a*, 105*b* as noted above, data can be loaded from the main memory and/or other lower cache levels into its CPU cache.

In at least one embodiment, the data storage system can be configured to include one or more pairs of nodes, where each pair of nodes can be generally as described and represented as the nodes 102*a-b* in the FIG. 2A. For example, a data storage system can be configured to include at least one pair of nodes and at most a maximum number of node pairs, such as for example, a maximum of 4 node pairs. The maximum number of node pairs can vary with embodiment. In at least one embodiment, a base enclosure can include the minimum single pair of nodes and up to a specified maximum number of PDs. In some embodiments, a single base enclosure can be scaled up to have additional BE non-volatile storage using one or more expansion enclosures, where each expansion enclosure can include a number of additional PDs. Further, in some embodiments, multiple base enclosures can be grouped together in a load-balancing cluster to provide up to the maximum number of node pairs. Consistent with other discussion herein, each node can include one or more processors and memory. In at least one embodiment, each node can include two multi-core processors with each processor of the node having a core count of between 8 and 28 cores. In at least one embodiment, the PDs can all be non-volatile SSDs, such as flash-based storage devices and storage class memory (SCM) devices. It should be noted that the two nodes configured as a pair can also sometimes be referred to as peer nodes. For example, the node A 102a is the peer node of the node B 102b, and the node B 102b is the peer node of the node A 102a.

In at least one embodiment, the data storage system can be configured to provide both block and file storage services with a system software stack that includes an operating system running directly on the processors of the nodes of the system.

In at least one embodiment, the data storage system can be configured to provide block-only storage services (e.g., no file storage services). A hypervisor can be installed on each of the nodes to provide a virtualized environment of virtual machines (VMs). The system software stack can execute in the virtualized environment deployed on the hypervisor. The system software stack (sometimes referred to as the software stack or stack) can include an operating system running in the context of a VM of the virtualized environment. Additional software components can be included in the system software stack and can also execute in the context of a VM of the virtualized environment.

In at least one embodiment, each pair of nodes can be configured in an active-active configuration as described elsewhere herein, such as in connection with FIG. 2A, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes are not shared with other pairs of nodes. A host can access data stored on a BE PD through the node pair associated with or attached to the PD.

In at least one embodiment, each pair of nodes provides a dual node architecture where both nodes of the pair can be generally identical in terms of hardware and software for redundancy and high availability. Consistent with other discussion herein, each node of a pair can perform processing of the different components (e.g., FA, DA, and the like) in the data path or I/O path as well as the control or management path. Thus, in such an embodiment, different components, such as the FA, DA and the like of FIG. 1, can denote logical or functional components implemented by code executing on the one or more processors of each node. Each node of the pair can include its own resources such as its own local (i.e., used only by the node) resources such as local processor(s), local memory, and the like.

Consistent with other discussion herein, a cache can be used for caching write I/O data and other cached information. In one system, the cache used for caching logged writes can be implemented using multiple caching devices or PDs, such as non-volatile (NV) SSDs such as NVRAM devices that are external with respect to both of the nodes or storage controllers. The caching devices or PDs used to implement the cache can be configured in a RAID group of any suitable RAID level for data protection. In at least one embodiment, the caching PDs form a shared non-volatile cache accessible to both nodes of the dual node architecture. It should be noted that in a system where the caching devices or PDs are external with respect to the two nodes, the caching devices or PDs are in addition to other non-volatile PDs accessible to both nodes. The additional PDs provide the BE non-volatile storage for the nodes where the cached data stored on the caching devices or PDs is eventually flushed to the BE PDs as discussed elsewhere herein. In at least one embodiment, a portion of each node's local volatile memory can also be used for caching information, such as blocks or pages of user data and metadata. For example, such node-local cached pages of user data and metadata can be used in connection with servicing reads for such user data and metadata.

In the following paragraphs, the one or more caching devices or PDs may be referred to as a data journal or log used in the data storage system. In such a system, the caching devices or PDs are non-volatile log devices or PDs upon which the log is persistently stored. It should be noted that as discussed elsewhere herein, both nodes can also each have local volatile memory used as a node local cache for storing data, structures and other information. In at least one embodiment, the local volatile memory local to one of the nodes is used exclusively by that one node.

In a data storage system, minimizing the latency of I/O requests is a critical performance metric. In at least one data storage system using the dual node architecture such as described in connection with FIG. 2A, for write operations, latency can be affected by the amount of time taken to store the write data in the log where the write data is visible to both nodes or controllers of the system.

Consistent with other discussion herein, the log file used to log user operations, such as write I/Os, can be used to optimize write operation latency. Generally, a write operation writing data is received by the data storage system from a host or other client. The data storage system then performs processing to persistently record the write operation in the log. Once the write operation is persistently recorded in the log, the data storage system can send an acknowledgement to the client regarding successful completion of the write operation. At some point in time subsequent to logging the write operation the log, the write operation is flushed or destaged from the log to the BE PDs. In connection with flushing the recorded write operation from the log, the data written by the write operation is stored on non-volatile physical storage of a BE PD. The space of the log used to record the write operation that has been flushed can now be reclaimed for reuse.

It should be noted that the flushing of the log can be performed in response to an occurrence of any one or more defined conditions. For example, the log can be flushed in response to determining that the amount of reclaimed log space available for use and allocation is less than a specified threshold amount or size.

In at least one embodiment, a metadata (MD) structure of mapping information can be used in accordance with the techniques herein.

The mapping information can be used, for example, to map a logical address, such as a LUN and an LBA or offset, to its corresponding storage location, such as a physical storage location on BE non-volatile PDs of the system. Consistent with discussion elsewhere herein, write requests or operations stored in the log can be flushed to the BE PDs (non-volatile) providing storage locations for the written data. For example, a logged write operation that writes first data to a logical address can be flushed whereby the logged first data is written out to a physical storage location on a BE PD. The mapping information can be used to map the logical address to the physical storage location containing the content or data stored at the logical address. In at least one embodiment, the mapping information includes a MD structure that is hierarchical structure of multiple layers of MD pages or blocks.

Figure 3:
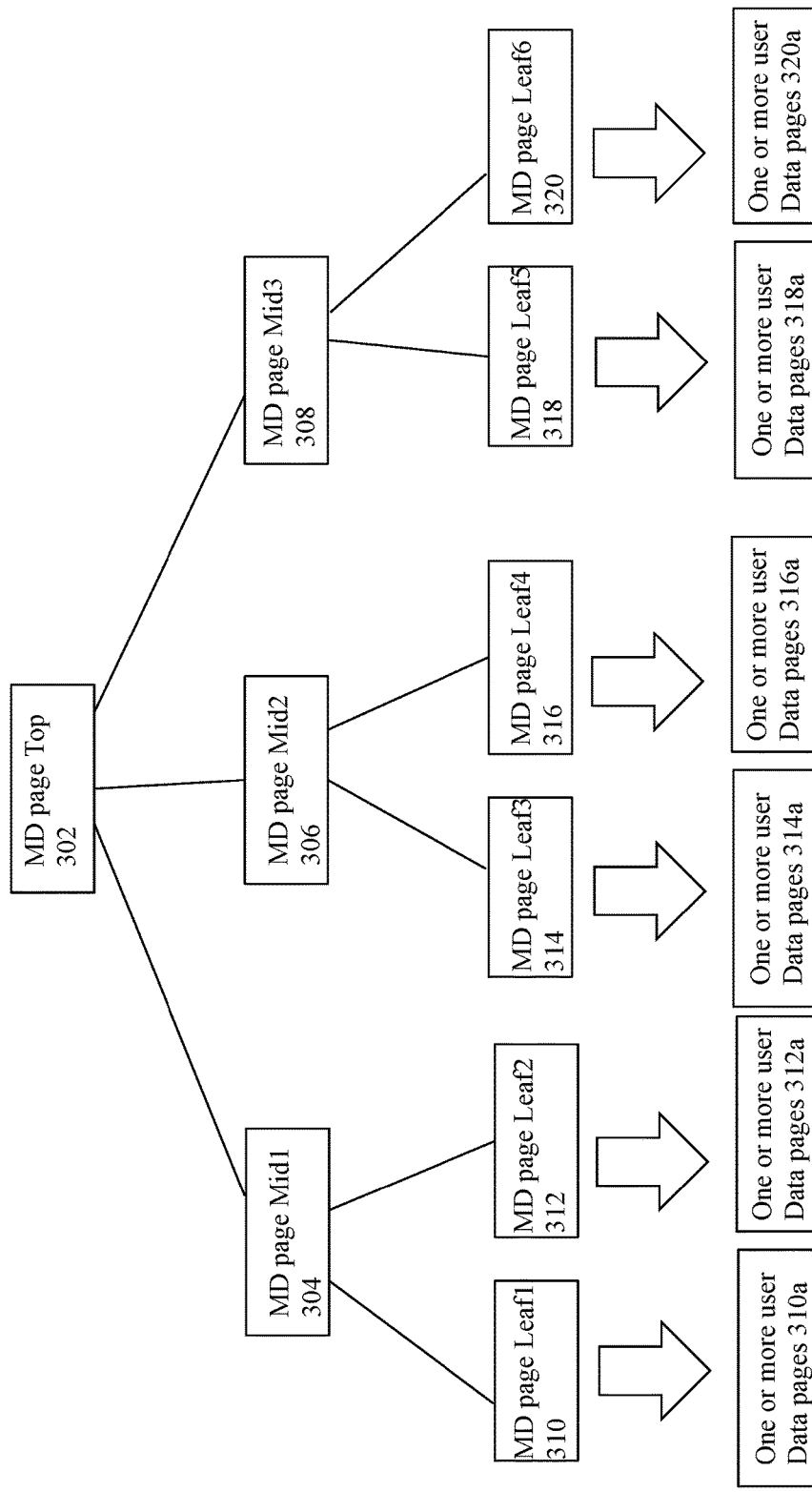
FIGS. 3, 4, 5, and 6 are examples of mapping information in the form of a metadata structure that can be used in connection with mapping logical addresses to physical addresses or storage locations in at least one embodiment in accordance with the techniques of the present disclosure.

In at least one embodiment, the mapping information or MD structure for a LUN, such as a LUN A, can be in the form of a tree having a plurality of levels of MD pages. More generally, the mapping structure can be in the form of any ordered list or hierarchical structure. In at least one embodiment, the mapping structure for the LUN A can include LUN MD in the form of a tree having 3 levels including a single top or root node (TOP node), a single mid-level (MID node) and a bottom level of leaf nodes (LEAF nodes), where each of the MD page leaf nodes can point to, or reference (directly or indirectly) one or more pages of stored data, such as user data stored on the LUN A. Each node in the tree corresponds to a MD page including MD for the LUN A. More generally, the tree or other hierarchical structure of various MD pages of the mapping structure for the LUN A can include any suitable number of levels, such as more than 3 levels where there are multiple mid-levels. In at least one embodiment the tree of MD pages for the LUN can be a B+ tree, also sometimes referred to as an "N-ary" tree, where "N" indicates that each node in the tree structure can have up to a maximum of N child nodes. For example, in at least one embodiment, the tree of MD pages for the LUN can specify N=512 whereby each node in the tree structure can have up to a maximum of N child nodes. For simplicity of illustration, the tree structure of MD pages, corresponding to the mapping structure in at least one embodiment, is represented in FIG. 3 as including only 3 levels where each node in the tree can have at most 3 child nodes. Generally, the techniques herein can be used with any layered or hierarchical structure of MD pages.

Before describing in more detail the mapping information of MD pages that can be used in an at least one embodiment to map a logical address to a corresponding physical storage location or address, further details are described in connection with using a log for logging user or client operations, such as write I/Os.

Consistent with other discussion herein, the log can be used to optimize write operation latency. Generally, the write operation writing data is received by the data storage system from a host or other client. The data storage system then performs processing to persistently record the write operation in the log. Once the write operation is persistently recorded in the log, the data storage system can send an acknowledgement to the client regarding successful completion of the write operation. At some point in time subsequent to logging the write operation the log, the write operation is flushed or destaged from the log to the BE PDs. In connection with flushing the recorded write operation from the log, the data written by the write operation is stored on non-volatile physical storage of a BE PD. The space of the log used to record the write operation that has been flushed can now be reclaimed for reuse. The write operation can be recorded in the log in any suitable manner and can include, for example, recording a target logical address to which the write operation is directed and recording the data written to the target logical address by the write operation.

In the log, each logged operation can be recorded in the next logically sequential record of the log. For example, a logged write I/O and write data (e.g., write I/O payload) can be recorded in a next logically sequential record of the log. The log can be circular in nature in that once a write operation is recorded in the last record of the log, recording of the next write proceeds with recording in the first record of the log.

The typical I/O pattern for the log as a result of recording write I/Os and possibly other information in successive consecutive log records includes logically sequential and logically contiguous writes (e.g., logically with respect to the logical offset or ordering within the log). Data can also be read from the log as needed (e.g., depending on the particular use or application of the log) so typical I/O patterns can also include reads. The log can have a physical storage layout corresponding to the sequential and contiguous order in which the data is written to the log. Thus, the log data can be written to sequential and consecutive physical storage locations in a manner corresponding to the logical sequential and contiguous order of the data in the log. Additional detail regarding use and implementation of the log in at least one embodiment in accordance with the techniques of the present disclosure is provided below.

Figure 2B:
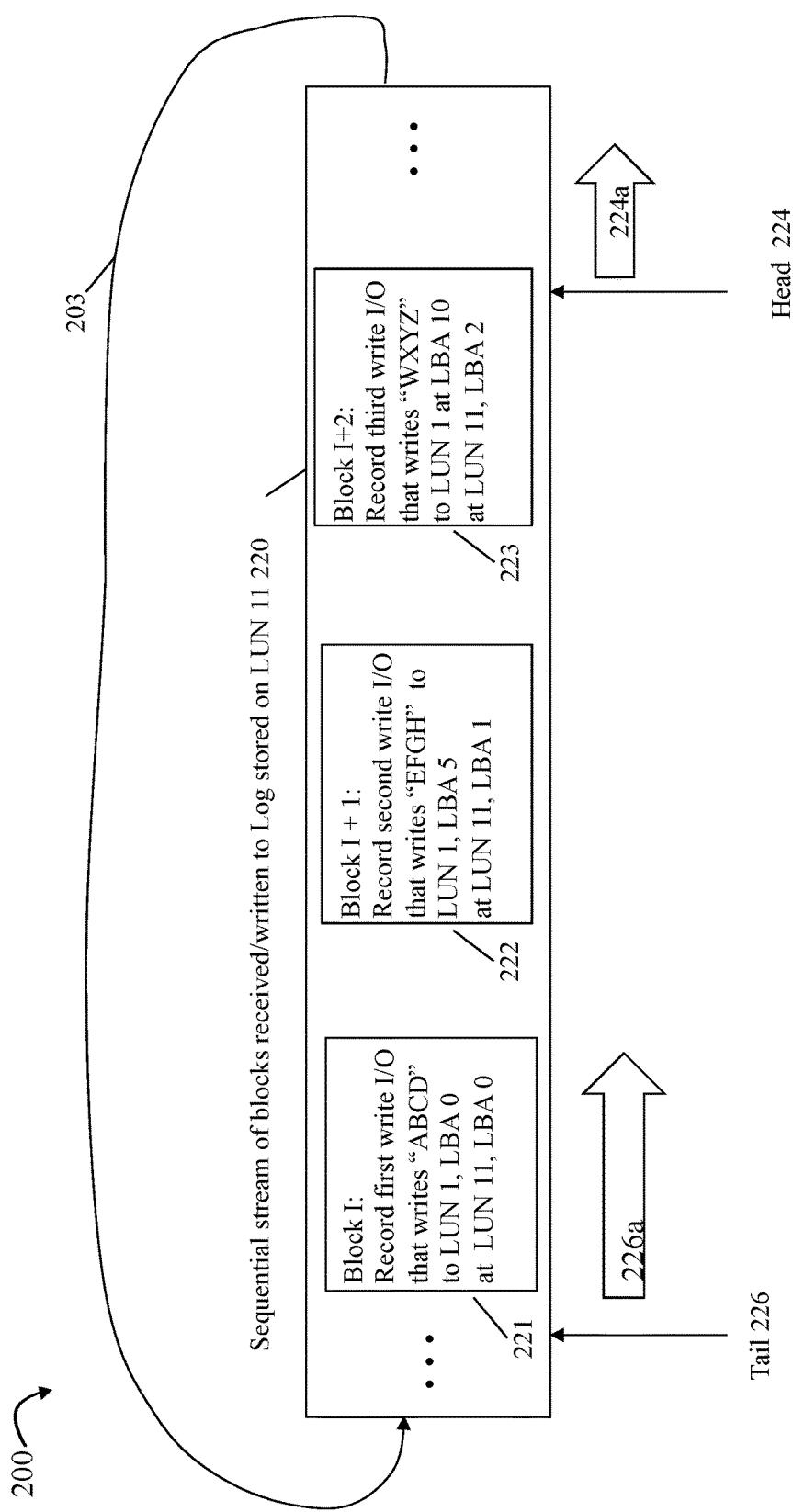
FIGS. 2B, 2C and 2D are examples illustrating use of a log or journal recording client operations in at least one embodiment in accordance with the techniques of the present disclosure.

Referring to FIG. 2B, shown is an example 200 illustrating a sequential stream 220 of operations or requests received that are written to a log in an embodiment in accordance with the techniques of the present disclosure. In this example, the log can be stored on the LUN 11 where logged operations or requests, such as write I/Os that write user data to a file, target LUN or other storage object, are recorded as records in the log. The element 220 includes information or records of the log for 3 write I/Os or updates which are recorded in the records or blocks I 221, I+1 222 and I+2 223 of the log (e.g., where I denotes an integer offset of a record or logical location in the log). The blocks I 221, I+1 222, and I+2 223 can be written sequentially in the foregoing order for processing in the data storage system. The block 221 can correspond to the record or block I of the log stored at LUN 11, LBA 0 that logs a first write I/O operation. The first write I/O operation can write "ABCD" to the target logical address LUN 1, LBA 0. The block 222 can correspond to the record or block I+1 of the log stored at LUN 11, LBA 1 that logs a second write I/O operation. The second write I/O operation can write "EFGH" to the target logical address LUN 1, LBA 5. The block 223 can correspond to the record or block I+2 of the log stored at LUN 11, LBA 2 that logs a third write I/O operation. The third write I/O operation can write "WXYZ" to the target logical address LUN 1, LBA 10. Thus, each of the foregoing 3 write I/O operations logged in 221, 222 and 223 write to 3 different logical target addresses or locations each denoted by a target LUN and logical offset on the target LUN. As illustrated in the FIG. 2B, the information recorded in each of the foregoing records or blocks 221, 222 and 223 of the log can include the target logical address to which data is written and the write data written to the target logical address.

The head pointer 224 can denote the next free record or block of the log used to record or log the next write I/O operation. The head pointer can be advanced 224*a* to the next record in the log as each next write I/O operation is recorded. When the head pointer 224 reaches the end of the log by writing to the last sequential block or record of the log, the head pointer can advance 203 to the first sequential block or record of the log in a circular manner and continue processing. The tail pointer 226 can denote the next record or block of a recorded write I/O operation in the log to be destaged and flushed from the log. Recorded or logged write I/Os of the log are processed and flushed whereby the recorded write I/O operation that writes to a target logical address or location (e.g., target LUN and offset) is read from the log and then executed or applied to a non-volatile BE PD location mapped to the target logical address (e.g., where the BE PD location stores the data content of the target logical address). Thus, as records are flushed from the log, the tail pointer 226 can logically advance 226a sequentially (e.g., advance to the right toward the head pointer and toward the end of the log) to a new tail position. Once a record or block of the log is flushed, the record or block is freed for reuse in recording another write I/O operation. When the tail pointer reaches the end of the log by flushing the last sequential block or record of the log, the tail pointer advances 203 to the first sequential block or record of the log in a circular manner and continue processing. Thus, the circular logical manner in which the records or blocks of the log are processed form a ring buffer in which the write I/Os are recorded.

When a write I/O operation writing user data to a target logical address is persistently recorded and stored in the non-volatile log, the write I/O operation is considered complete and can be acknowledged as complete to the host or other client originating the write I/O operation to reduce the write I/O latency and response time. The write I/O operation and write data are destaged at a later point in time during a flushing process that flushes a recorded write of the log to the BE non-volatile PDs, updates and writes any corresponding metadata for the flushed write I/O operation, and frees the record or block of the log (e.g., where the record or block logged the write I/O operation just flushed). The metadata updated as part of the flushing process for the target logical address of the write I/O operation can include mapping information as described elsewhere herein. The mapping information of the metadata for the target logical address can identify the physical address or location on provisioned physical storage on a non-volatile BE PD storing the data of the target logical address. The target logical address can be, for example, a logical address on a logical device, such as a LUN and offset or LBA on the LUN.

Figure 2C:
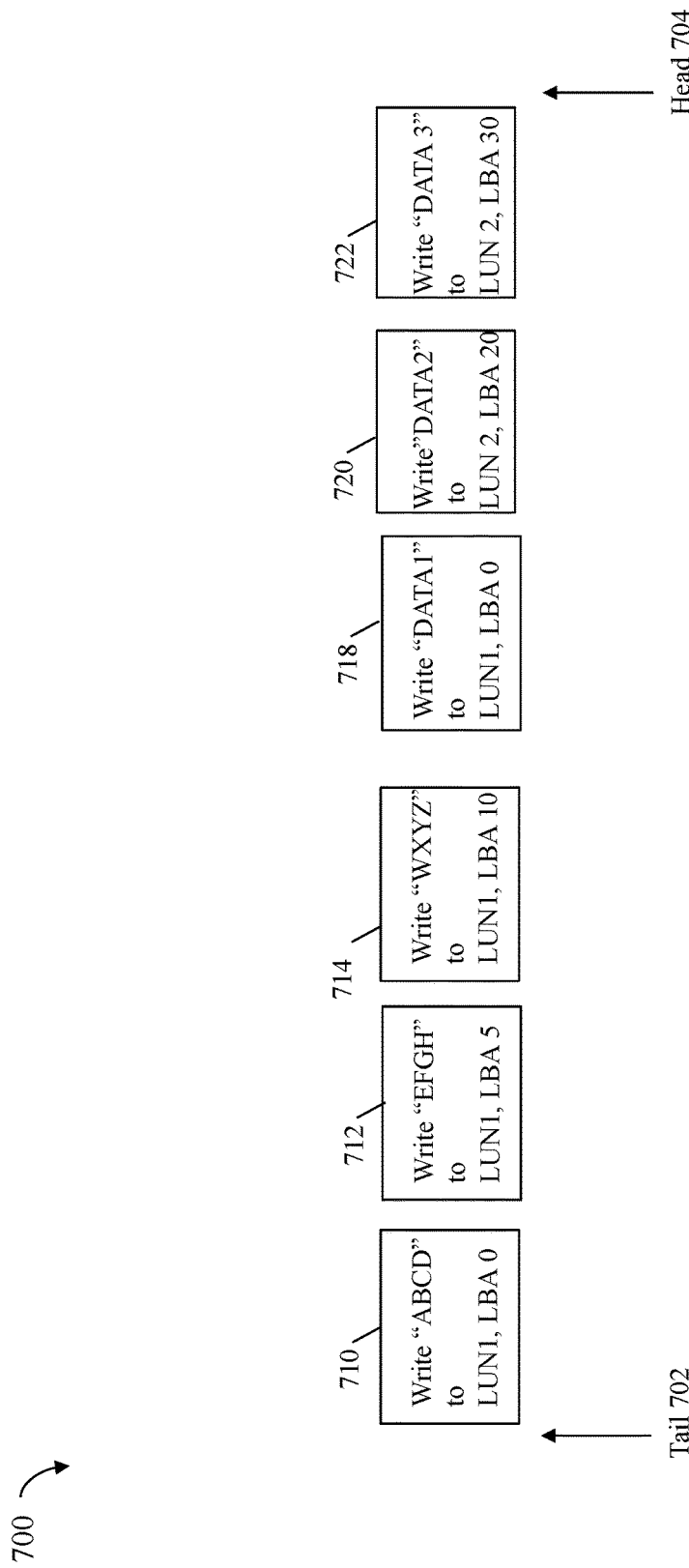

Referring to FIG. 2C, shown is an example of information that can be included in a log, such as a log of user or client write operations, in an embodiment in accordance with the techniques of the present disclosure.

The example 700 includes the head pointer 704 and the tail pointer 702. The elements 710, 712, 714, 718, 720 and 722 denote 6 records of the log for 6 write I/O operations recorded in the log. The element 710 is a log record for a write operation that writes "ABCD" to the LUN 1, LBA 0. The element 712 is a log record for a write operation that writes "EFGH" to the LUN 1, LBA 5. The element 714 is a log record for a write operation that writes "WXYZ" to the LUN 1, LBA 10. The element 718 is a log record for a write operation that writes "DATA1" to the LUN 1, LBA 0. The element 720 is a log record for a write operation that writes "DATA2" to the LUN 2, LBA 20. The element 722 is a log record for a write operation that writes "DATA3" to the LUN 2, LBA 30. As illustrated in FIG. 2C, the log records 710, 712, 714, 718, 720 and 722 can also record the write data (e.g., write I/O operation payload) written by the write operations. It should be noted that the log records 710, 712 and 714 of FIG. 2C correspond respectively to the log records 221, 222 and 223 of FIG. 2B.

The log can be flushed sequentially or in any suitable manner to maintain desired data consistency. In order to maintain data consistency when flushing the log, constraints can be placed on an order in which the records of the log are flushed or logically applied to the stored data while still allowing any desired optimizations. In some embodiments, portions of the log can be flushed in parallel in accordance with any necessary constraints needed in order to maintain data consistency. Such constraints can consider any possible data dependencies between logged writes (e.g., two logged writes that write to the same logical address) and other logged operations in order to ensure write order consistency.

Figure 2D:
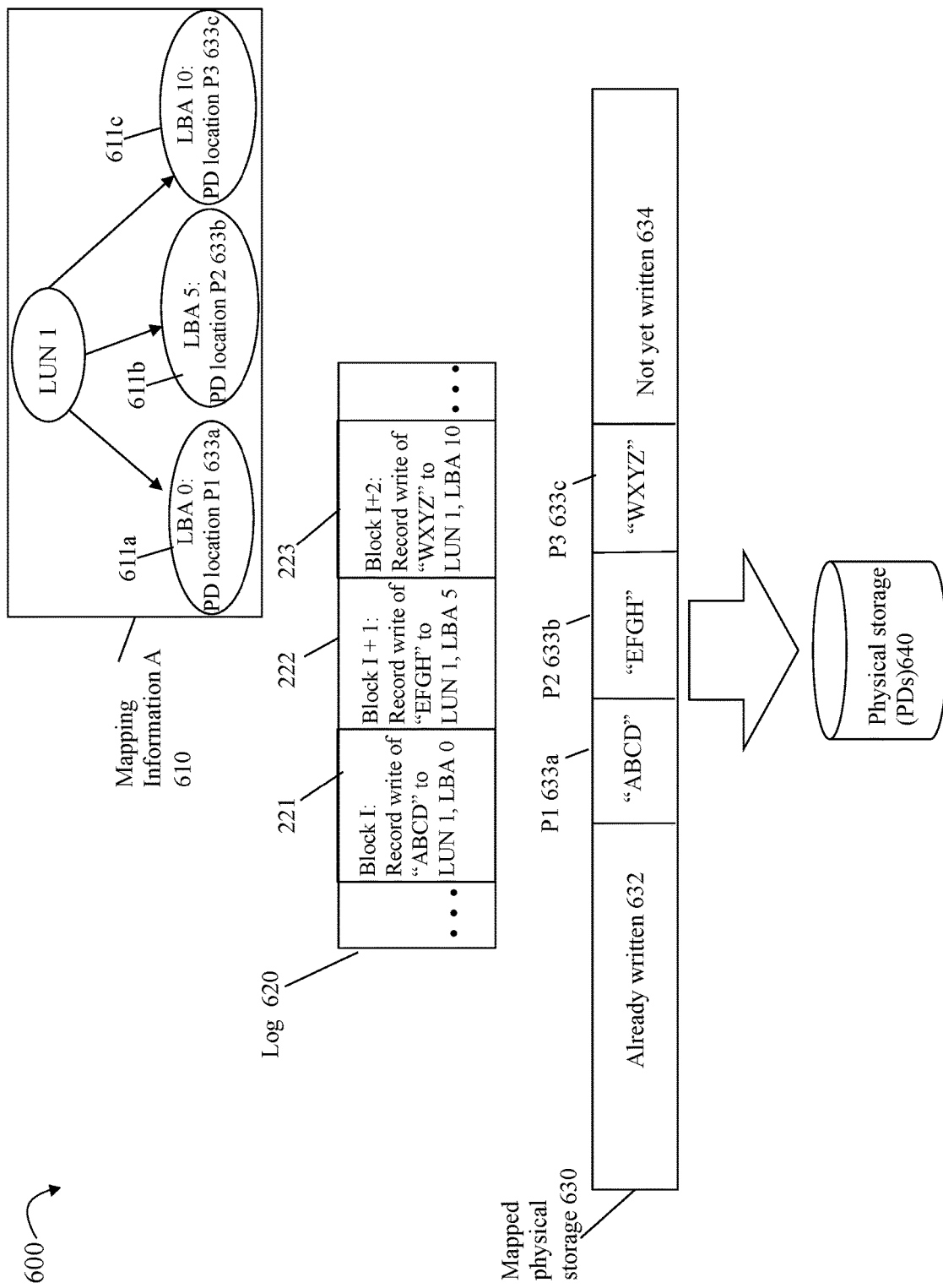

Referring to FIG. 2D, shown is an example 600 illustrating the flushing of logged writes and the physical data layout of user data on BE PDs in at least one embodiment in accordance with the techniques of the present disclosure. FIG. 2D includes the log 620, the mapping information A 610, and the physical storage (i.e., BE PDs) 640. The element 630 represents the physical layout of the user data as stored on the physical storage 640. The element 610 can represent the logical to physical storage mapping information A 610 created for 3 write I/O operations recorded in the 3 log records or blocks 221, 222 and 223.

The mapping information A 610 includes the elements 611a-c denoting the mapping information, respectively, for the 3 target logical address of the 3 recorded write I/O operations in the log records 221, 222, and 223. The element 611a of the mapping information denotes the mapping information for the target logical address LUN1, LBA 0 of the block 221 of the log 620. In particular, the block 221 and mapping information 611a indicate that the user data "ABCD" written to LUN 1, LBA 0 is stored at the physical location (PD location) P1 633a on the physical storage 640. The element 611b of the mapping information denotes the mapping information for the target logical address LUN1, LBA 5 of the block 222 of the log 620. In particular, the block 222 and mapping information 611b indicate that the user data "EFGH" written to LUN 1, LBA 5 is stored at the physical location (PD location) P2 633b on the physical storage 640. The element 611c of the mapping information denotes the mapping information for the target logical address LUN 1, LBA 10 of the block 223 of the log 620. In particular, the block 223 and mapping information 611 indicate that the user data "WXYZ" written to LUN 1, LBA 10 is stored at the physical location (PD location) P3 633c on the physical storage 640.

The mapped physical storage 630 illustrates the sequential contiguous manner in which user data can be stored and written to the physical storage 640 as the log records or blocks are flushed. In this example, the records of the log 620 can be flushed and processing sequentially (e.g., such as described in connection with FIG. 2B) and the user data of the logged writes can be sequentially written to the mapped physical storage 630 as the records of the log are sequentially processed. As the user data pages of the logged writes to the target logical addresses are written out to sequential physical locations on the mapped physical storage 630, corresponding mapping information for the target logical addresses can be updated. The user data of the logged writes can be written to mapped physical storage sequentially as follows: 632, 633a, 633b, 633c and 634. The element 632 denotes the physical locations of the user data written and stored on the BE PDs for the log records processed prior to the block or record 221. The element 633a denotes the PD location P1 of the user data "ABCD" stored at LUN 1, LBA 1. The element 633b denotes the PD location P2 of the user data "EFGH" stored at LUN 1, LBA 5. The element 633c denotes the PD location P3 of the user data "WXYZ" stored at LUN 1, LBA 10. The element 634 denotes the physical locations of the user data written and stored on the BE PDs for the log records processed after the block or record 223.

In one aspect, the data layout (e.g., format or structure) of the log-based data of the log 620 as stored on non-volatile storage can also be physically sequential and contiguous where the non-volatile storage used for the log can be viewed logically as one large log having data that is laid out sequentially in the order it is written to the log.

The data layout of the user data as stored on the BE PDs can also be physically sequential and contiguous. As log records of the log 620 are flushed, the user data written by each flushed log record can be stored at the next sequential physical location on the BE PDs. Thus, flushing the log can result in writing user data pages or blocks to sequential consecutive physical locations on the BE PDs. In some embodiments, multiple logged writes can be flushed in parallel as a larger chunk to the next sequential chunk or portion of the mapped physical storage 630.

Consistent with other discussion herein, the mapped physical storage 630 can correspond to the BE PDs providing BE non-volatile storage used for persistently storing user data as well as metadata, such as the mapping information. With a log-structured system as discussed herein, as recorded writes in the log are processed, the data written by the writes can be written to new physical storage locations on the BE PDs.

Referring to FIG. 3, shown is an example 300 of a tree of MD pages that can be used in an embodiment in accordance with the techniques herein. The example 300 includes a tree of MD pages denoting the mapping structure as discussed above with 3 levels-a top or root level, level 1, including a single MD TOP page; a single mid or middle level, level 2, of MD MID pages; and a bottom level, level 3, of leaf nodes of MD LEAF pages. In the example 300, the top or root level, level 1, includes MD page 302; the mid or middle level, level 2, includes MD pages 304, 306 and 308; and the bottom level, level 3, includes MD pages 310, 312, 314, 316, 318 and 320, which can also be referred to as leaf nodes. As also illustrated in the example 300, each of the leaf MD pages in level 3 of the tree points to, or references (e.g., directly or otherwise indirectly using one more additional levels of indirection of pointers not illustrated) one or more user data pages or blocks including data stored at various LBAs of a LUN such as the LUN A. For example, MD pages 310, 312, 314, 316, 318 and 320 point or reference, respectively, one or more UD pages 310a, 312a, 314a, 316a, 318a and 320a.

The links or connections between a parent node (at level M) and its one or more child nodes (at level M+1) in the tree 300 generally represent mappings between the parent node and the one or more child nodes. In at least one embodiment, the parent node can include a reference used to access (directly or indirectly) each of its one or more child nodes. For example, the root node MD page top 302 can include addresses or pointers used to access each of its child nodes 304, 306 and 308. The mid-level node MD page mid1 304 can include addresses or pointers used to access each of its child leaf nodes 310, 312. The mid-level node MD page mid 306 can include addresses or pointers used to access each of its child leaf nodes 314, 316. The mid-level node MD page mid 308 can include addresses or pointers used to access each of its child leaf nodes 318, 320.

In at least one embodiment, each of the addresses or pointers included in a MD page that references a location in another MD page or references a location in a UD page can be a physical storage location on the back-end PDs. Thus, the traversal between connected nodes of the structure 300 can correspond to traversing physical address or storage locations included in pages or nodes that are parent nodes.

In connection with accessing a particular UD page in at least one embodiment, all MD pages in a path from the root or top level of the tree to the UD page can be traversed in a consecutive serialized order in which such pages appear in the path traversal down the path from the top or root level to the UD page accessed using a particular one of the MD page leaf nodes. For example, assume UD page or block X is included in the set of UD pages 312a. In order to access UD page X of 312a, the following denotes the consecutive serialized order in which the MD pages forming a sequence are accessed: MD page top 302, MD page mid1 304, and MD page leaf2 312. Generally, in at least one embodiment, each of the MD pages can include pointers or addresses to locations of one or more child pages or nodes. Thus, the foregoing traversal of MD pages denotes the sequence of MD pages that are processed in consecutive serialized order in order to access the particular UD page, such as UD page X. In order to access the UD page X as stored on PDs where UD page X includes first data needed to service a read I/O operation in connection with a cache miss of the first data, each of the MD pages in the foregoing sequence (e.g., MD page top 302, MD page mid1 304, and MD page leaf2 312) needs to be accessed in consecutive serialized order. In at least one embodiment, the sequence of MD pages, and more generally, the path from the MD page top to the UD page X, forms a linked list of nodes of pages. In at least one embodiment, each parent node or MD page of the structure 300 can generally include multiple pointers or references to locations of its child nodes or pages. For example, MD page top 302 includes pointers to locations of its child nodes, MD pages 304, 306 and 308. MD page mid2 306 includes pointers to locations of its child nodes, MD pages 314 and 316.

The data pages 310a, 312a, 314a, 316a, 318a and 320a include UD stored on particular logical addresses of a LUN's address space, such as the LUN A's logical address space. In at least one embodiment each MD leaf can hold MD for a specified number of LBAs of a LUN. For example, in one embodiment each MD leaf can hold MD for 512 LBAs. For example, with reference to FIG. 3, the data pages 310a, 312a, 314a, 316a, 318a and 320 each include user data stored on particular logical addresses of the LUN A's logical address space. It may be, for example, that element 310a includes user data stored at a first set of LBAs 0-511; and that element 312a includes user data stored at a second set of LBAs 512-1023. Generally, the particular LBAs of the LUN mapped to each MD page can vary with embodiment. For example, in at least one embodiment, consecutive sequential subranges of the LUN's logical address space can be mapped to the MD page leaves. Additionally, when the tree is traversed in a depth first manner, the MD page leaves can correspond to consecutive sequential subranges. For example, the element 310a denotes data pages for LBAs 0-511; the element 312a denotes data pages for the LBAs 512-1023; the element 314a denotes data pages for LBAs 1024-1535; the element 316a denotes data pages for LBAs 1536-2047, and so on.

As generally known in the art, a depth-first traversal is an algorithm for traversing or tree or graph data structures. The algorithm starts at the root node (selecting some arbitrary node as the root node in the case of a graph) and explores as far as possible along each path extending from the root to a leaf node before backtracking up the path to find a yet another unexplored path. In at least one embodiment, traversal of the tree 300 of MD pages in a depth-first manner explores all paths, in sequential order, from the left-most path to the right most path as arranged in the tree.

In at least one embodiment, when the structure 300 is traversed in a depth first manner (i.e., from the left-most path to the right most path as arranged in the tree), the MD page leaf nodes that occur in the depth first traversal correspond to consecutive sequential LBA subranges of a LUN. In at least one embodiment, when the overall tree including MD page top node 302 and all its descendant nodes are traversed in this depth first manner, the MD page leaf nodes that occur in the depth first traversal correspond to consecutive sequential LBA subranges of a LUN.

In at least one embodiment as described herein, each of the MD pages and data blocks in the example 300 can be of a predetermined size and each of the MD pages can hold a known number of entries containing pointer or address values. In such a case and in combination with the correspondence of sequential consecutive LBA ranges of each MD leaf page, an embodiment can perform a calculation to determine the MD page at a particular level that is accessed in the tree MD mapping structure 300 to determine the data block for a particular LUN and LBA. Similarly, it is a straightforward mathematical calculation to determine the index, offset of entry in a particular page or node to be accessed in connection with obtaining data blocks stored at the particular LUN and LBAs of the LUN. Each MD page in 300 can be known to include MD relevant for accessing data on a particular LUN and one or more LBAs of that LUN. For example, consistent with discussion above, the element 310*a* denotes the data blocks for LBAs 0-511 of a LUN. In order to access the data block for an LBA of the LUN in the LBA subrange 0-511, MD pages 302, 304 and 310 can be traversed in sequential order. In particular, the first entry or offset of the MD page top 302 can contain the address of the MD page mid 1 304; the first entry or offset of the MD page mid 1 304 can contain the address of the MD page leaf 1 310; and the first entry or offset of the MD page leaf 1 310 can contain the address of one of the data blocks of 310*a*.

In a similar manner, a mapping can be made regarding what MD pages of the structure 300 and entries thereof are used in connection with obtaining data blocks containing data for any particular LUN and LBA. In at least one embodiment, the particular MD pages used to access a data block including data for a particular LUN and LBA can be known based on such mappings and correspondence of LBA subranges to particular MD leaf pages.

Figure 4:
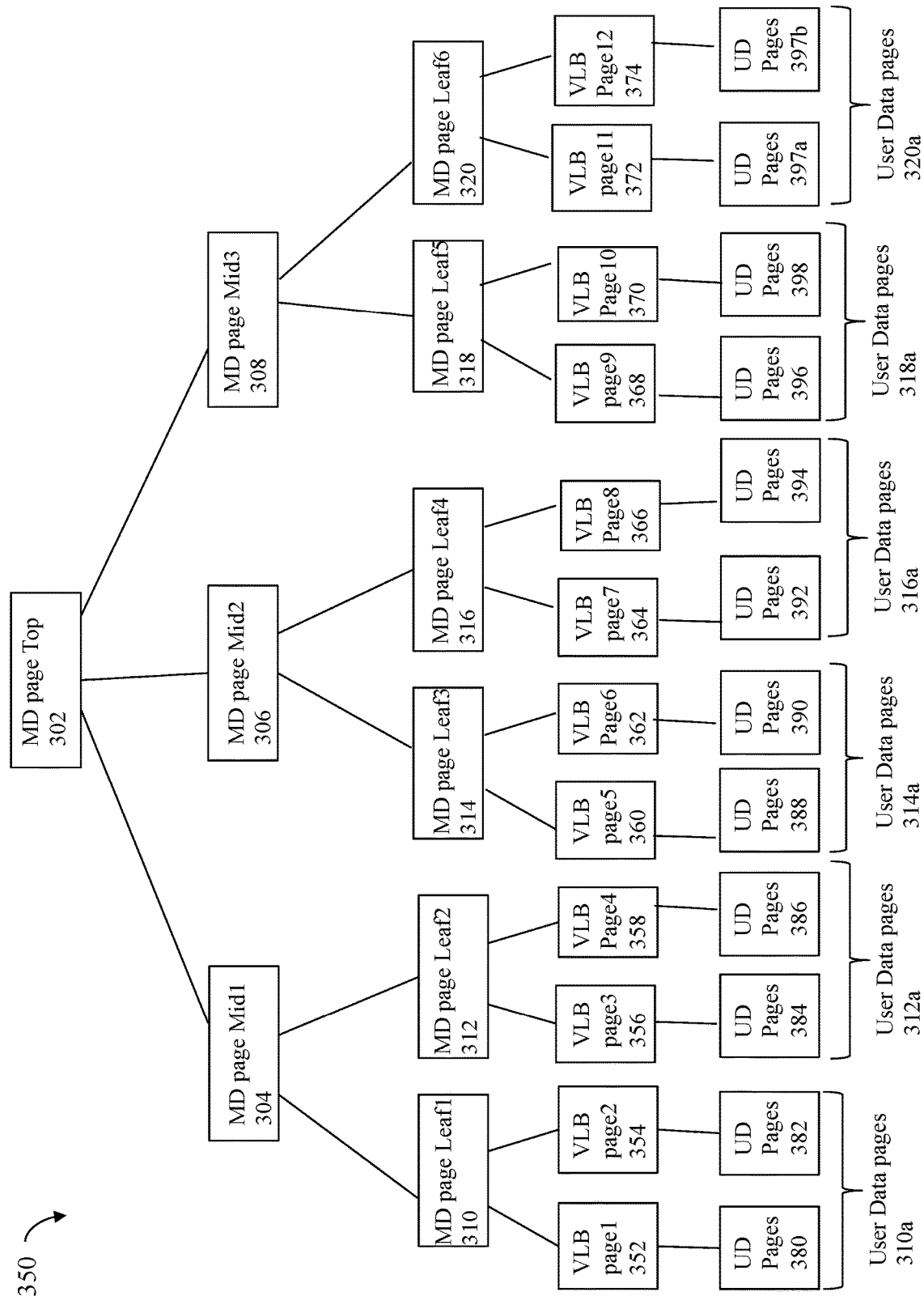

Referring to FIG. 4, shown is a more detailed version of a hierarchical structure used as the mapping structure 108 that can be used in an embodiment in accordance with the techniques of the present disclosure. The structure 350 is similar to the structure 300 as described and illustrated in FIG. 3 with the added difference that more detail is provided regarding the intervening layer of a VLB (virtualization layer block) MD pages between the MD page leaves and the UD pages. Thus, in such an embodiment, the structure 350 includes 4 levels of MD pages as opposed to the possible 3 levels as allowed in the more generalized structure 300 represented in FIG. 3. In this case, each sequence of MD pages traversed in a path from the MD page top or root to access a particular UD page includes 4 MD pages-MD page top 302, one of the MD page Mid nodes (e.g., one of 304, 306 or 308), one of the MD page leaf nodes (e.g., one of 310, 312, 314, 316, 318 and 320), and one of the VLB pages (e.g., one of 352, 354, 356, 358, 360, 362, 364, 366, 368, 370, 372 and 374).

In at least one embodiment, the use of VLBs as a layer in the hierarchy between the MD leaf nodes and the UD pages can be used to facilitate different data storage services, such as relocating UD between different physical storage location, data deduplication, and the like. An entry of the VLB associated with a particular physical storage location can be remapped without requiring remapping of a MD leaf to the UD page.

The UD pages 380 and 382 denote two portions of UD pages corresponding to UD pages 310*a* of FIG. 3 including data for LBAs 0-511. The UD pages 384 and 386 denote two portions of UD pages corresponding to UD pages 312*a* of FIG. 3 including data for LBAs 512-1023. The UD pages 388 and 390 denote two portions of UD pages corresponding to UD pages 314*a* of FIG. 3 including data for LBAs 1024-1535. The UD pages 392 and 394 denote two portions of UD pages corresponding to UD pages 316*a* of FIG. 3 including data for LBAs 1536-2047. The UD pages 396 and 398 denote two portions of UD pages corresponding to UD pages 318*a* of FIG. 3 including data for LBAs 2048-2559. The UD pages 397*a* and 397*b* denote two portions of UD pages corresponding to UD pages 320*a* of FIG. 3 including data for LBAs 2560-3072.

In furtherance of the example above regarding UD page X and now with reference to FIG. 4, assume more specifically that UD page X is located in the set of UD pages denoted by 384. In this case, the MD page sequence including the MD pages traversed in order to access UD page X 384 includes MD page 302, MD page 304, MD page 312, and VLB page3 356.

Figure 5:
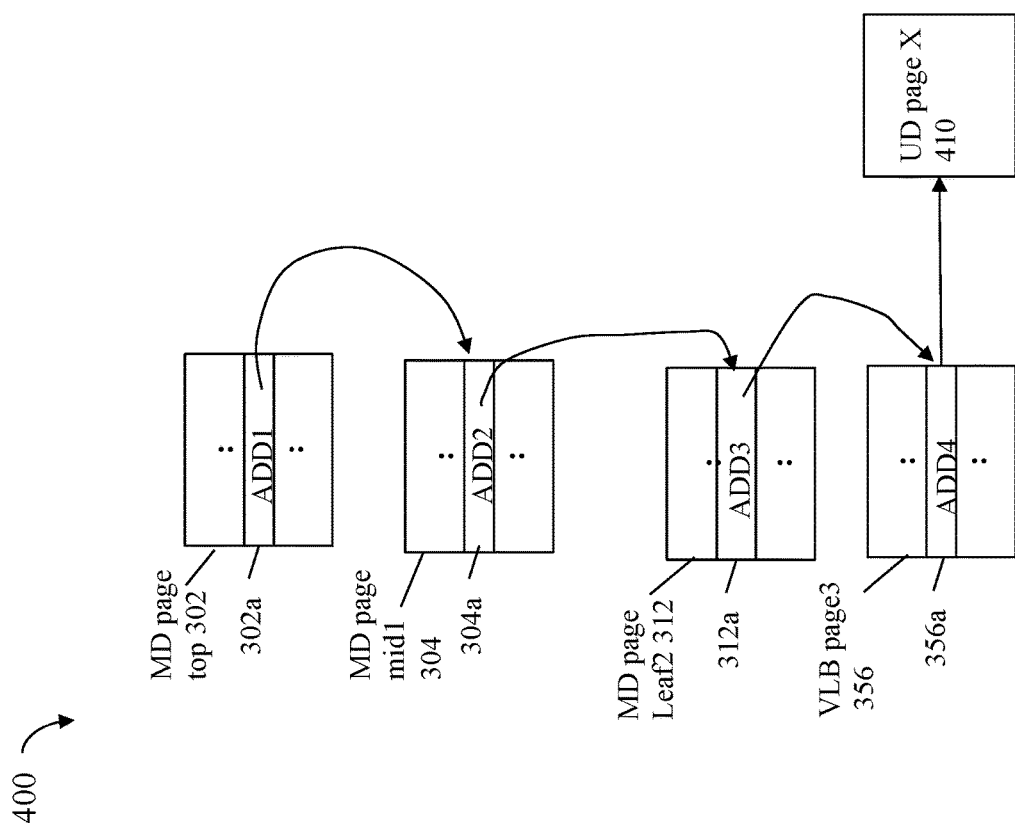

Referring to FIG. 5, shown is a more detailed representation 400 of the MD pages of the sequence traversed to access the UD page X 384 included in the set of UD pages 312*a*. As noted above, the MD page sequence includes MD page 302, MD page 304, MD page 312, and VLB page3 356. In the example 400, MD page top 302 includes an entry or address 302*a* that points to or references the location 304*a* in the MD page mid1 304. In at least one embodiment, the starting entry 302*a* in the first MD page 302 of the sequence can be determined based on the logical address including the desired UD stored in a page or block of storage (e.g., physical non-volatile storage location on the BE PDs of the system). For example, assume processing is performed to read the UD for LUN A, LBA 514 located in UD page X. In at least one embodiment, the logical address LUN A, LBA 514 can be used to determine the particular structure instance and thus the particular MD page top 302 to access. The LBA 514 of the logical address of the UD can also be used to determine an index or offset into the MD page 302 to determine the relevant entry, location or address 302*a* having a pointer, address or reference to an entry in the next MD page in the sequence to access the desired page including the UD for LUN A, LBA 514. An embodiment can generally use any suitable technique to map a corresponding logical address, such as an LBA of a particular LUN, to an entry in the top level MD page 302.

The MD page top 302 can be accessed and read from a PD to obtain the address or pointer ADD1 from location 302*a*. If the MD page 302 is already in cache, the cached copy can be used to obtain the address or pointer ADD1 from the location 302*a*. The address or pointer ADD1 of location 302*a* can then be used to identify the entry 304*a* of the particular mid level MD page, such as MD page mid1 304, that is accessed next in the sequence.

Continuing with the example 400, the MD page mid1 304 can be accessed where the location 304a is read to obtain the address or pointer ADD2 from location 304a. The address or pointer ADD2 can then be used to identify the entry 312a of a particular leaf level MD page, such as MD page leaf2 312, that is next accessed in the sequence. If the MD page mid1 304 is not in cache, the on-disk copy of the MD page 304 on a PD can be accessed to read the address or pointer ADD2 from the location 304a. The address or pointer ADD2 identifies location 312a of the MD page leaf 2 312. If the MD page 312 is not already in cache, the on-disk copy of the MD page 312 on a PD can be read to obtain the content of location 312a. The location 312a of the MD page leaf2 312 can be accessed and read to obtain the address or pointer ADD3 from location 312a. The address or pointer ADD3 can then be used to identify a particular entry of a VLB page, such as the entry 356a of the VLB page3 356, that is next accessed in the sequence. Thus, ADD3 can denote the location or address of the entry 356a in the VLB page 3 356.

If the VLB page 356 is not already in cache, the on-disk copy of the VLB page 356 on a PD can be read to obtain the content of location 356a. The location 356a of the VLB page 3 356 can be accessed and read to obtain the address or pointer ADD4 from the location 356a. The address or pointer ADD4 can then be used to identify the particular UD page X 410 where the UD page X can next be read. If the UD page X is not in cache, the on-disk copy of the UD page X can be read in from a PD.

The example 400 of FIG. 5 includes the path or traversal of MD pages in the structure 350 from the MD page root or top 302 to the UD page X of 384 including the desired UD for the logical address LUN A, LBA 514. The path or traversal of MD pages 302, 304, 312, 356 and 384 denotes the sequence of MD pages read and accessed in order to obtain the UD page X of 384.

Figure 6:
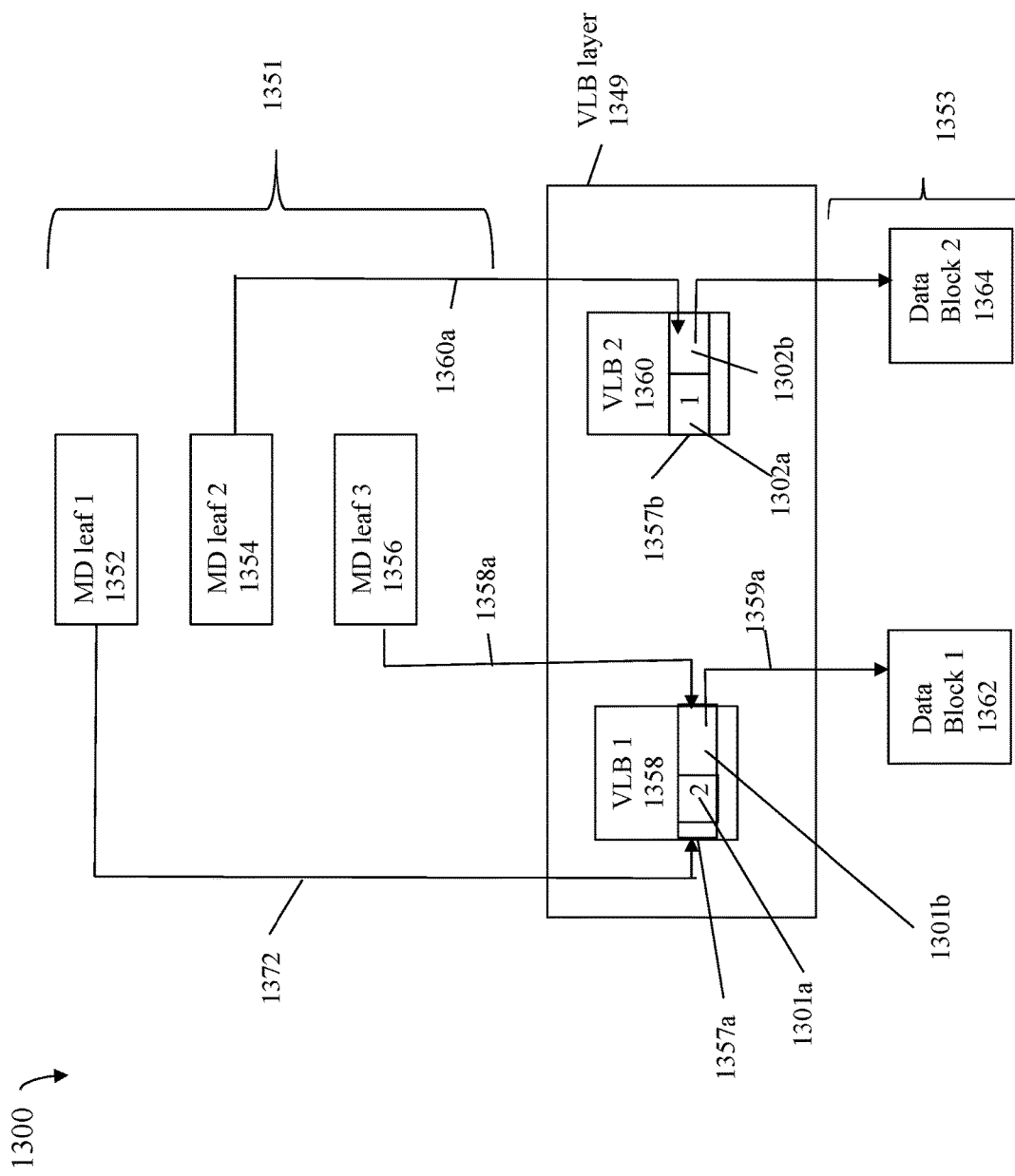

Referring to FIG. 6, shown is an example illustrating in more detail a particular embodiment in which a VLB layer of multiple VLBs is the intervening layer between the MD leaf nodes of the mapping structure 108 and the data blocks. The elements 1352, 1354 and 1356 can denote 3 MD leaf nodes included in a MD leaf layer of a MD mapping structure such as described herein (e.g., in FIGS. 3, 4 and 5). The elements 1358 and 1360 denote 2 VLBs included in the intervening VLB layer 1349 between MD leaf nodes 1351 and data blocks 1353. The elements 1362 and 1364 denote 2 data blocks each storing content such as user data stored at logical addresses. In the example 1300, the MD leaf nodes 1352 and 1356 both indirectly reference the same data block 1362 through the same entry 1357a of the VLB 1358. The two MD leaf nodes 1352 and 1356 both referencing the same data block 1362 indirectly through use of the same VLB entry 1357a can be a mapping resulting from data deduplication processing. In the example 1300, MD leaf node 1354 points to the entry 1357b of the VLB 1360 whereby the entry 1357b of the VLB2 1360 then further references or points to the data block 1364. The data blocks 1362, 1364 can denote user data blocks as described herein.

The element 1358a denotes a pointer to, or address of, the entry 1357a in the VLB 1358 used in connection with obtaining the data block 1362 stored on a particular LUN and LBA of the LUN. The pointer 1358a can be used as the virtual or indirect pointer in connection with obtaining the data block 1362. In at least one embodiment, the VLB 1358 can be a VLB page or node as described herein. Thus, in such an embodiment, the virtual or indirect pointer 1358a can be a pointer to the entry 1357a of the VLB structure 1358, where the entry 1357a can further include fields 1301a and 1301b. The field 1301b can be a pointer to, or address of, the user data block 1362. The field 1301a can be a reference count or counter indicating the number of instances of, or references to, the particular data block 1362 (e.g., data block pointed to by 1301b).

The element 1372 denotes a pointer to, or address of, the entry 1357a in the VLB 1358 used in connection with obtaining the data block 1362 stored on a particular LUN and LBA of the LUN. The pointer 1372 can be used as the virtual or indirect pointer in connection with obtaining the data block 1362. In at least one embodiment, the VLB 1358 can be a VLB page or node as described herein. Thus, in such an embodiment, the virtual or indirect pointer 1372 can be a pointer to the entry 1357a of the VLB structure 1358, where the entry 1357a can further include the fields 1301a and 1301b. The field 1301b can be a pointer to, or address of, the user data block 1362. The field 1301a can be a reference count or counter indicating the number of instances of, or references to, the particular data block 1362 (e.g., data block pointed to by 1301b).

The element 1360a denotes a pointer to, or address of, the entry 1357b in the VLB 1360 used in connection with obtaining the data block 1364 stored on a particular LUN and LBA of the LUN. The pointer 1360a can be used as the virtual or indirect pointer in connection with obtaining the data block 1364. Thus, in such an embodiment, the virtual or indirect pointer 1360a can be a pointer to the entry 1357b of the VLB structure 1360, where the entry 1357b can further include the fields 1302a and 1302b. The field 1302b can be a pointer to, or address of, the user data block 1364. The field 1302a can be a reference count or counter indicating the number of instances of, or references to, the particular data block 1362 (e.g., data block pointed to by 1302b).

The reference count 1301a can be initialized to 1 when a first or initial instance of the associated data block 1362 is stored. In this example, the reference 1301a is 2 indicating that there are 2 instances of the data block 1362 and thus 2 references to the data block 1362. In this case, the are 2 instances of the data block 1362 in stored user data. The instances denoted by the reference count 1301a include all deduplicated instances corresponding to entries of the MDL leaves 1352, 1356 that respectively point 1372, 1358a to the VLB entry 1357a associated with the single copy of the data block 1362.

The reference count 1302a can be initialized to 1 when a first or initial instance of the associated data block 1364 is stored. In this example, the reference 1302a is 1 indicating that there is 1 instance of the data block 1364 and thus 1 reference to the data block 1364. The instances denoted by the reference count 1302a generally include any/all deduplicated instances associated with the single copy of the data block 1364. However, in this example, there is only a single reference to, and single instance of, the data block 1364 in stored user data. In particular, the MD leaf 1354 references or points (1360a) to the VLB entry 1357b associated with the single copy of the data block 1364.

In at least one embodiment, each VLB can be a VLB page or node as described herein including multiple entries, such as 512 entries, where each such VLB entry can include one or more fields of information such as the address or pointer to one of the data blocks such as 1362 or 1364.

In at least one embodiment, each MD leaf can have multiple entries, such as 512 entries, each corresponding to a different logical address in a logical address range corresponding to the MD leaf.

For a read I/O operation received at a node of a dual node system or appliance such as in an active-active configuration, servicing the read operation can include reading one or more data blocks or storage locations as well as reading information from one or more MD pages such as, for example, of the MD or mapping structure as described in connection with FIGS. 3-6.

For a write I/O operation received at a node of a dual node system or appliance such as in an active-active configuration, servicing the write operation can include reading information from one or more MD pages. Servicing the write operation can include updating one or more data blocks or storage locations as well as updating one or more MD pages such as, for example, of the MD or mapping structure as described in connection with FIGS. 3-6.

In at least one embodiment, the MD or mapping information used in connection with stored user data can be stored on non-volatile storage, such as on the BE PDs of the appliance or data storage system. At least some of the MD pages of mapping information for all such user data can be stored in a volatile memory cache of each of the nodes of the appliance or system. Depending on the write operation, one or more logical addresses can be updated with new data or content by a write operation. Additionally, one or more MD pages used to map the one or more logical addresses to one or more physical storage locations storing the new data can also be updated, for example, to reference the one or more physical storage location including the new data or content.

With a log-structured system in at least one embodiment, as recorded writes of the log are processed and flushed or destaged to the BE PDs, the content written by the recorded writes of the log can be stored at new subsequent physical storage locations on the BE PDs. Additionally, the MD or mapping information corresponding to the logged writes being flushed can also be accordingly updated to reference the new subsequent physical storage locations on the BE PDs containing the content. In a dual node appliance or system with an active-active configuration as described herein, both nodes of the system can concurrently receive and service write I/Os, as well as other received requests and commands using shared resources such as, for example, the MD or mapping structure described in connection with the FIGS. 3-6.

In at least one embodiment, updates or modifications to the MD pages of the mapping structure described in connection with the FIGS. 3-6 can also similarly be recorded in entries or records of a persistently stored metadata log and then flushed or destaged from the metadata log to persistent BE storage of the BE PDs. In at least one embodiment, the MD pages of the MD or mapping structure such as described in connection with the FIGS. 3-6 can be persistently stored in a MD page store on the BE PDs of the system. In some contexts herein, the copy of a MD page as stored in the MD page store on the BE PDs can also be referred to herein as the on-disk copy of the MD page.

Workflows for some implementations to perform reads and writes to the MD page can include loading the entire MD page into the cache or volatile memory of a node, if the MD page is not already in the cache or volatile memory of the node.

A data storage system can perform different data services such as data deduplication discussed above to remove redundant or duplicate copies of data or content by storing a single copy of the user data and having multiple references or pointers to the same stored single copy. For example, the content or user data can be stored in a single data block that can be referenced by multiple logical addresses where the content of the data block is stored at all the multiple logical addresses.

In connection with data deduplication, the data block that includes the user data or content can be associated with a MD page, where the MD page can include a reference count denoting the number of references to the data block. For example reference is made back to FIG. 6 and discussion above regarding FIG. 6. In at least one embodiment using the MD structures as described, for example, in connection with FIGS. 3, 4, 5, and 6, the reference count associated with a data block can be included in an entry of a VLB page associated with the data block. For example with reference to FIG. 6, the VLB entry 1357a includes a field 1301a with the reference count=2 for the associated data block 1362; and the VLB entry 1357b includes a field 1301a with the reference count=1 for the associated data block 1364.

The reference count such as of the VLB entries 1357a, 1357b, can be updated in connection with deduplication processing. For example, deduplication processing can be performed on new data written to a target logical address by a write I/O operation. Deduplication processing can determine that the new data is a duplicate of existing data stored in a data block. Rather than store another copy of the same data in another data block, deduplication processing can include alternatively having the target logical address reference the single existing copy of the data as stored in the data block. As part of deduplication processing, the reference count associated with the single existing copy of the data block can be incremented as each additional reference to the same data block is made. In a similar manner, the reference count can be decremented as content of a particular logical address is modified or deleted to no longer be considered a duplicate of the single existing copy of the data block.

Consistent with other discussion herein in at least one embodiment, updates or modifications can be with respect to user data or stored content modified by client or host write I/Os as well as with respect to metadata, such as updates or modifications to the MD structure or mapping information described above. As noted above in at least one embodiment to increase performance, the updates to user data can be stored (e.g., persisted temporarily) in a log or journal logging client or host writes, and the updates to the MD or mapping information can be stored (e.g., persisted temporarily) in a metadata log. One characteristic of a log structured system, such as in connection with the metadata log and log of client updates or writes, is that updates or modifications (which are recorded in an associated log and then flushed to long term storage of the BE PDs) may not physically overwrite or update the same BE PD physical location storing the old data or existing content (e.g., no physical in place update). Rather, the newly written or updated data is typically written to a different physical location on the BE PDs. Thus, the BE PDs can retain the valid old data in the original physical location for some time before being reclaimed for reuse by garbage collection processing.

Garbage collection can be performed in connection with storage management of the BE PDs to reclaim and reuse free or invalidated physical storage as new data is written. In some cases, "holes" of storage storing old, unused or invalid content can be interspersed among portions of storage storing current valid content. Garbage collection can include performing processing which allows multiple holes of storage including unused or invalid data to be compacted into a single larger contiguous storage portion which can then be reused. Thus garbage collection processing can include moving first storage portions of valid data or content interspersed among holes of invalid content from a source to a target location to thereby make free or available a larger contiguous storage portion including the holes of invalid content.

Consistent with other discussion herein, an entry from the log of user or client updates (sometimes referred to as the UD (user data) log) can be an update to a logical address (e.g., LUN and LBA) which writes content to a UD page. Flushing the entry can include destaging the updated UD page to a backend storage location on non-volatile storage (e.g., BE PD location). Additionally, flushing and destaging the entry from the UD log can include updating the corresponding MD pages which map the logical address to its corresponding BE PD location including the content stored at the logical address. In at least one existing system, the mapping information including MD pages as described herein can thus be updated. For example, such updating of the mapping information can include updating any of the top, mid and leaf MD pages used in connection with mapping the logical address to the BE PD location including the content stored at the logical address. In at least one existing implementation, updating the corresponding mapping information and MD pages can include loading all the MD pages into the cache if any such MD pages are not already in cache. The MD pages of the mapping information can be characterized as a chain forming an access sequence of top MD page, mid MD page, and leaf MD page.

The techniques of the present disclosure provide for maintaining and utilizing a page-based cache for storing MD pages. In at least one embodiment, the page-based cache can be referred to as a unified cache or hybrid cache used for caching MD leaf objects. Each of the MD leaf objects can be a cached object which is similar to a regular MD leaf page such as described elsewhere herein (e.g., FIGS. 3-6) with a difference that the entries of a cached MD leaf object of the unified cache can include multiple types of pointers or addresses. Consistent with other discussion herein, a regular MD leaf page includes multiple entries where each entry corresponds to an associated logical address. For example, entry E1 of a regular MD leaf page can include a pointer, address or reference used to access content stored at an associated logical address LA. Each of the entries E1 of the regular MD leaf page can include an indirect pointer IP1 which indirectly references or identifies a physical address or location A2 in a physical large block (PLB) of non-volatile BE storage, where the physical address or location A2 contains the content or user data stored at a corresponding logical address LA associated with the corresponding entry E1. In at least one embodiment, IP1 of entry E1 of a regular MD leaf page can be an address A1 of an entry E2 in a VLB page. The entry E2 of the VLB page can further include the address A2, where A2 is the physical address or location in a PLB storing the content or user data of the logical address LA. In at least one embodiment, each entry E1 of a regular MD leaf page can include a VLB pointer, such as A1 noted above, which is an address, location, or offset of a corresponding entry E2 in a VLB page. Each entry E2 of a VLB page can include a PLB pointer, such as A2 noted above, which is a physical address or location in a PLB. Thus, in at least one embodiment, each regular MD leaf page comprises entries which can include only VLB pointers and not include any PLB pointers. In at least one embodiment, each regular VLB page comprises entries which can include only PLB pointers.

In contrast to regular MD leaf pages noted above, in at least one embodiment, each cached MD leaf object of the unified or hybrid cache comprises entries which can include both VLB pointers and PLB pointers. Thus, the cached MD leaf objects of the unified cache can be characterized as having entries with mixed or different pointer types. An entry of a cached MD leaf object of the unified cache can include a VLB pointer type which is an address, offset or reference to a VLB entry. In at least one embodiment, an entry of a cached MD leaf object including a VLB pointer corresponds to a logical address that has not been read such as with a read I/O operation from a host, so that the PLB pointer of the PLB address of the content of the logical address has not yet been resolved. An entry of a cached MD leaf object of the unified cache can include PLB pointer corresponding to a logical address that has been read, such as with a read I/O operation from a host, so that the PLB pointer of the PLB address of the content of the logical address has been determined and resolved. In at least one embodiment, all entries of a cached MD leaf object can initially include only VLB pointers. In at least one embodiment, entries of the cached MD leaf object can be subsequently updated lazily, on demand, as I/Os for specified logical addresses are processed or serviced, where such I/O processing or servicing results in obtaining a PLB pointer. In particular, the I/O processing or servicing of a read I/O to read content from logical address LA can include using a VLB pointer of an entry E1 of the cached MD leaf object for LA to further obtain a corresponding PLB pointer used to access the content stored at the logical address LA. Subsequently, the entry E1 of the cached MD leaf object can be updated to store the corresponding PLB pointer rather than the VLB pointer.

In at least one embodiment, each cached MD leaf object of the unified cache can correspond to a defined user data (UD) logical address range of a fixed or predetermined size. For example, consistent with other discussion herein in at least one embodiment, each regular MD leaf object and also each cached MD leaf object of the unified cache, can have a corresponding logical address or LBA range R1 of 2 MBs. R1 can denote an LBA range in a storage object or resource, such as a logical device, volume or LUN, storing user data or content. In this case, each entry of a regular MD leaf and also each entry of a cached MD leaf object can be included in a chain of MD pages of mapping information use to access content or user data stored at a corresponding logical address in the LBA range R1. In such an embodiment, each entry of a regular MD leaf and also each entry of a cached MD leaf object of the unified cache can correspond uniquely to one of the logical addresses LA in R1 where that entry of the regular MD leaf is included in the chain of MD pages of mapping information for LA.

In at least one embodiment, the unified cache MD leaf objects can each correspond to a different or unique user data logical address range (e.g., no overlap in LBA ranges of different cached MD leaf objects).

In at least one embodiment, the unified cache of MD leaf objects can be implemented using a hash table HT of unique cached MD leaf objects. Each MD leaf object associated with an LBA range R1 has a starting logical address or LBA and an ending logical address or LBA. The unified cache, and thus HT, can be indexed or accessed using the starting LBA of an LBA range associated with each MD leaf object. Generally, the starting LBA or logical address S1 can be mapped to a corresponding index I denoting an entry or index of HT. The mapping can be performed using a hashing function or algorithm F, where $F(S1)=I$, and where $HT(I)$ is associated with the MD leaf object having an associated range R1 with the starting LBA or logical address S1. Thus, the hash table HT of the unified cache can use S1 values associated with different MD leaf objects as keys to access cached content, where such cached content is the cached MD leaf objects.

In at least one embodiment, a user data (UD) or client logical address, which can be the target logical address of a client I/O operation such as a read or write operation, can be uniquely identified using the volume or LUN ID (identifier), or more generally a storage object or resource ID, in combination with the LBA or offset of the logical address. In at least one embodiment, the logical address denoted by the combination of the volume or LUN ID and the LBA or offset can be mapped to, and represented using, a ULXA value, where the value of the ULXA can be generally characterized as an identifier uniquely identifying a particular user data (UD) page within a data storage system, and if multiple storage systems are included in a cluster, uniquely identified within the cluster of data storage systems. Thus, the ULXA can be a value that denotes or represents the logical address such as the UD logical address. From a given ULXA value, the uniquely associated LUN ID and LBA denoting a logical address can be mapped or determined. Also, given a particular LUN ID and LBA (e.g., logical address), the unique corresponding ULXA value can be mapped or determined. In at least one embodiment in accordance with the techniques of the present disclosure, the ULXA value and/or its corresponding logical address can be used as an index into the ULXA cache. In the following paragraphs, reference can be made to accessing or indexing into the ULXA cache using logical addresses. Alternatively, corresponding ULXA values can also be utilized.

Figure 7A:
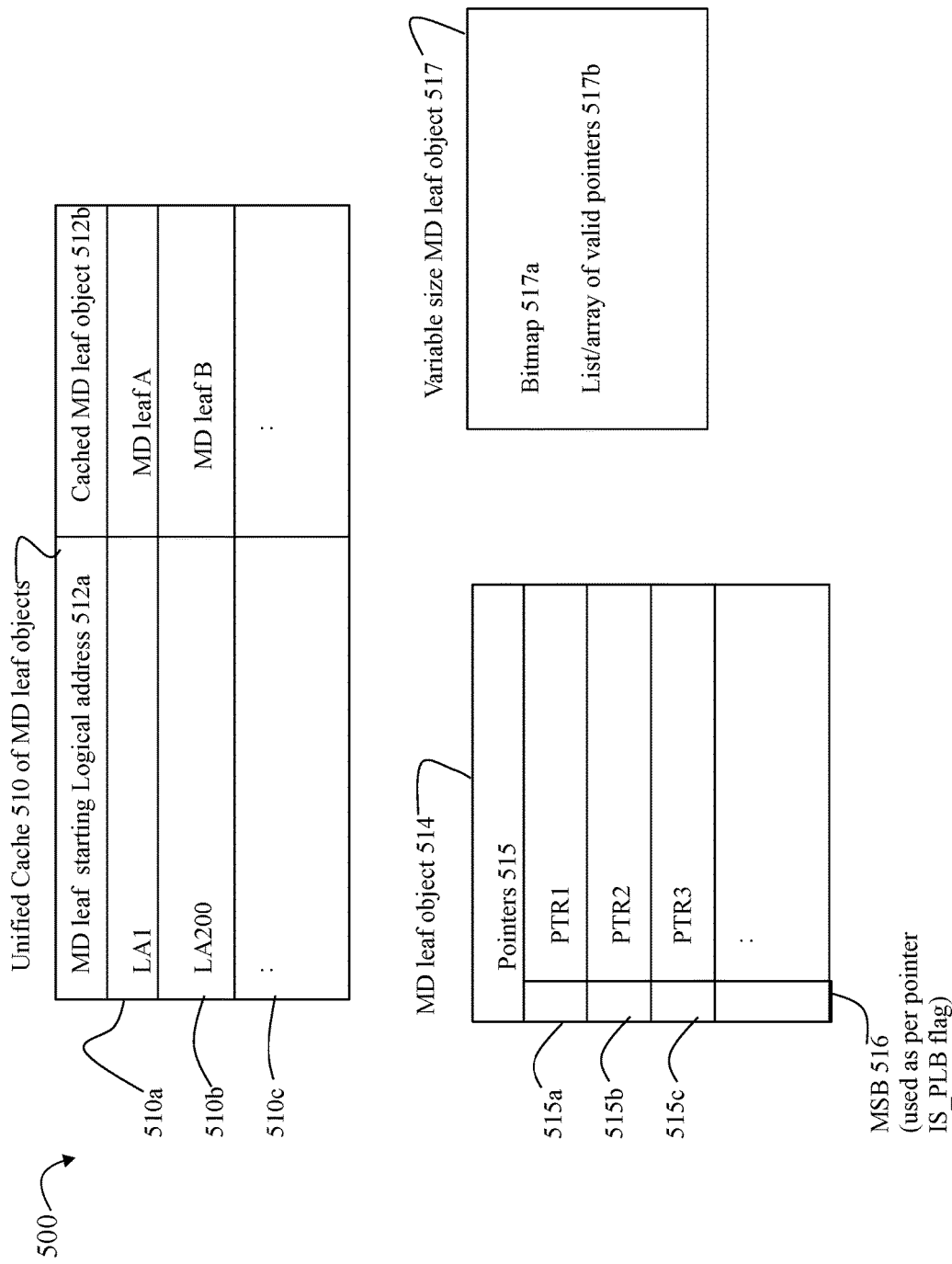
FIGS. 7A, 7B and 7C are examples illustrating information that can be cached in at least one embodiment in accordance with the techniques of the present disclosure.

Referring to FIG. 7A, shown is an example 500 of a unified cache of MD leaf objects and further details regarding a MD leaf object in at least one embodiment in accordance with the techniques of the present disclosure.

The example 500 includes a representation of the unified cache 510 of cached MD leaf objects. The unified cache 510 can be implemented as a hash table HT as noted above. The unified cache 510 includes a first column 512a denoting MD leaf starting logical addresses or LBAs (e.g., S1 values noted above), and a second column 512b denoting cache MD leaf objects. The column 512a denotes the key used by the hash table for indexing or accessing the cached content, where the cached content is the MD leaf objects of column 512b. Row 510a represents a first cached MD leaf object MD leaf A (512b) having a starting logical address LA1 (510a) where the cached MD leaf object A has an associated logical address range beginning with LA1. Row 510b represents a second cached MD leaf object MD leaf B (512b) having a starting logical address LA200 where the cached MD leaf object B has an associate logical address range beginning with LA200.

The example 500 also includes MD leaf object 514 providing further details regarding information that can be included in each instance of a cached MD leaf object (512b) of the unified cache 510. Each MD leaf object 514 can include multiple entries, such as 515a-c, where each such entry is used in connection with a chain of MD pages of mapping information mapping a corresponding logical address to a physical address or location containing content stored at the logical address. Thus, each entry of the MD leaf object 514 can be uniquely associated with a different logical address in the logical address range R1 associated with the particular instance of the MD leaf object 514, where R1 has a starting logical address S1 and an ending logical address Send. In at least one embodiment, each consecutive entry of the MD leaf object 514 can be associated with a corresponding consecutive logical address in the range R1 of the MD leaf object. For example, the entry 515a denotes the first entry 1 of the object 514 and can correspond to the first logical address S1 in R1; the entry 515b denotes the second entry 2 of the object 514 and can correspond to the next consecutive logical address, S1+1, in R1; 515c denotes the second entry of the object 514 and can correspond to the next consecutive logical address S1+2 in R1, and so on for subsequent consecutive entries of object 514. The MD leaf object 514 can include a number of entries such that each logical address in its corresponding range R1 is uniquely associated with a corresponding one of the entries of 514.

The entry 515a can correspond to the first entry of the cached MD leaf object 514, where 515a can include PTR1 generally denoting a pointer, address or reference to another location. The entry 515b can correspond to a second entry of the cached MD leaf object 514, where 515b can include PTR2 generally denoting a pointer, address or reference to another location. The entry 515c can correspond to a third entry of a cached MD leaf object 514, where 515c can include PTR3 generally denoting a pointer, address or reference to another location. Unlike a regular MD leaf in at least one embodiment, two different types of pointers can be allowed and stored in entries of each instance of the MD leaf object 514. In at least one embodiment, each entry of the MD leaf object 514 can include either a VLB pointer or a PLB pointer. For example, in at least one embodiment PTR1 of 515a can be either a VLB pointer or a PLB pointer; PTR2 of 515b can be either a VLB pointer or a PLB pointer; and PTR3 of 515b can be either a VLB pointer or a PLB pointer. Consistent with other discussion herein, an entry of the MD leaf object 514 can include a VLB pointer which can be subsequently overwritten or replaced with a corresponding PLB pointer. The VLB pointer, for example, of entry 515a can be updated to include the corresponding PLB pointer as I/Os directed to a logical address associated with the entry 515a are processed.

As an optional variation in at least one embodiment, the MD leaf object 514 can maintain both VLB pointers and PLBs, where a single entry of the MD leaf object 514 can include both a VLB pointer and a corresponding PLB pointer. In such an embodiment, rather than update or overwrite pointers in entries of the object 514 so as to maintain a single pointer or address field in each entry, each entry can include storage for both a VLB pointer and a PLB pointer. It should be noted that FIG. 7A and FIG. 7B discussed below can illustrate particular embodiments in which the MD leaf object can include only one pointer, such as either the VLB pointer or the PLB pointer but not both. However, such structures can be readily modified in accordance with other description herein for other variations also discussed herein.

In at least one embodiment, a flag, IS_PLB (is PLB ptr) can be maintained on a per pointer or per MD leaf object entry level and used to distinguish between different pointer types which can be stored in the entry or field thereof.

In at least one embodiment, IS_PLB can be represented using a single bit, such as the most significant bit (MSB) position 516 in the pointer field of each entry of the object 514. In at least one embodiment, if IS_PLB=0, it denotes that the pointer is a VLB pointer, and if IS_PLB=1, it denotes that the pointer is a PLB pointer. Initially, a regular MD leaf page can be read and stored in the unified cache as a MD leaf object 514 where all IS_PLB flags of all entries of the object are off or "0" since all such pointers are initially VLB pointers of the regular MD leaf page. In at least one embodiment, it may be that one or more entries of a regular MD leaf page, and thus also of a corresponding cached MD leaf object 514 of the unified cache 510, are invalid or do not contain a VLB pointer. Such one or more entries with invalid pointers can correspond to one or more logical addresses which have not been written to, or more generally otherwise, may have not corresponding or associated stored content. In this case in such an embodiment, the pointer field of the entry for an invalid pointer can include a unique predetermined specified pointer value to denote an invalid pointer attribute. For example, the predetermined pointer value can denote the invalid pointer attribute and invalid pointer state, IS_INVALID. In such an embodiment, each entry of the MD leaf object 514 can thus include the IS_INVALID value, a VLB pointer or a PLB pointer. In at least one embodiment, each instance of a VLB pointer or a PLB pointer can exist in an entry only if the entry does not include the IS_INVALID value as its pointer. In this manner, processing can logically determine whether an entry E1 of the MD leaf object 514 includes a valid pointer of any type by initially determining whether IS_INVALID is true with respect to the pointer of the entry E1. If IS_INVALID is false with respect to E1, then it is known that E1 includes some type of valid pointer, and processing can further examine MSB 516 or IS_PLB of the entry to determine whether the pointer type is a VLB pointer (e.g., IS_PLB=0), or whether the pointer type is a PLB pointer (e.g., IS_PLB=1).

In at least one embodiment, each pointer included in an entry of the MD leaf object 514 can be updated. Such updating can include changing the pointer value or address. Such updating can include changing the pointer type or status by setting the IS_PLB to 0 or 1 depending on the particular pointer type stored in the entry. Thus, a pointer in an entry of the object 514 can be updated from a VLB pointer to a PLB pointer, for example, where the VLB pointer is used as an indirect pointer to obtain a corresponding PLB pointer and access the associated content or user data stored at a PLB, and where subsequently the VLB pointer is updated, replaced or overwritten with the corresponding PLB pointer. Also, when the VLB pointer is updated with the corresponding PLB pointer, the associated IS_PLB flag can be updated from 0 to 1.

As an optional variation or optimization in at least one embodiment, each cached MD leaf object can be further implemented as a variable size object such as illustrated by element 517 only including valid pointers or addresses, and thus not including any pointer allocated storage for associated entries of the object 514 which are invalid (e.g., IS_INVALID is true). In at least one such variation, the variable size object instance 517 can include a bitmap 517*a* with a bit for each entry of the object 514, where the bit for a corresponding entry as a value of 1 if the object includes a valid pointer or address for the entry, and where the bit has a value of 0 if otherwise (e.g., invalid pointer for the associated entry). The variable size object 517 can also include a list or array 517*b* of valid pointers or addresses. Generally, the list or array 517*b* includes a corresponding entry for each bit of the bitmap 517 having a value of 1. The sequential consecutive order in which pointer values are stored in the list or array 517*b* corresponds to a relative position or index in the bitmap 517*a* for those bitmap entries of 517*a* which are 1 denoting a valid pointer. For example, assume a simple example where the bitmap 517*a* only identifies two valid pointers such that bitmap[1]=1 and bitmap [100]=1, with all other bitmap entries of 517*a* being 0 for invalid pointers. Thus, the list or array 517*b* includes only 2 pointers or addresses. In this case, bitmap[1]=1 (of 517*a*) indicates that entry 1 of the object 517 has a valid pointer, whereby the list or array[1] (of 517*b*) includes the pointer or address of entry 1, and where array[1] can include an MSB used as the IS_PLB flag having a corresponding value of 0 or 1 depending, respectively, on whether the pointer type of array[1] is either a VLB pointer or a PLB pointer. Also, bitmap[100]=1 (of 517*a*) indicates that entry 100 of the object 517 has a valid pointer, whereby the list or array (of 517*b*) includes the pointer or address of entry 100, and where array can include an MSB used as the IS_PLB flag having a corresponding value of 0 or 1 depending, respectively, on whether the pointer type of array[100] is either a VLB pointer or a PLB pointer.

With a variable size MD leaf object 517 in at least one embodiment, object allocation can be performed according to actual object size but with some minimum size granularity, such as, for example, 128 bytes. In at least one such embodiment, allocation of variable size MD leaf object instances 517 can be performed by allocating storage from a pool of variable size objects. For example, in at least one embodiment, the pool can include multiple lists of objects, where each list includes storage objects available for allocation and where the lists includes objects of different sizes. For example, a first list L1 can include only objects of a first size such as 4K bytes, a second list L2 can include only objects of a second size such as 2K bytes, and so on, for any suitable number of lists and sizes. For example in at least one embodiment, 6 lists can be used where each list includes only objects of one of the foregoing sizes: 4K bytes, 2K bytes, 1K bytes, 512 bytes, 256 bytes, and 128 bytes. In such an embodiment, the size of the object 517 can be determined at runtime and the smallest suitable available object allocated from one of the lists where the allocated object can have an associated size which is the smallest available size object able to store all desired object data. If a new (previously untouched or unwritten to) logical address is written, a new additional pointer for the logical address now becomes valid and added to the object 517. The new pointer, for example, can be added to the list or array 517*b* as a new entry, and a corresponding bit in the bitmap 517*a* updated from 0 to 1. If adding the new pointer to an existing instance J1 of the variable size MD leaf object 517 results in exceeding the current amount of allocated storage size of J1, a new object instance J2 of a MD leaf object 517 of a suitable size is allocated and updated to include all information from J1 and also updated to include the new pointer and updated associated bitmap entry. Also, the prior object instance J1 can be freed and made available for reuse or reallocation.

What will now be described is processing that can be performed in connection with updating and loading information into the unified cache 510 in at least one embodiment in accordance with the techniques of the present disclosure. In at least one embodiment, the unified cache 510 can be loaded and updated in a manner that can be characterized in one aspect as a lazy update or loading process. For purposes of illustration, assume that each regular MD leaf object and thus each MD leaf object of the unified cache is associated with a logical address range R1 that having a starting logical address S1 and an ending logical address Send. Also for purposes of illustration, assume that a read I/O, READ1, is received requesting to read content or data from the logical address LA1.

Generally, processing of the read I/O READ1 can include determining whether LA1 of the read I/O is included in a logical address range R1 where R1 has a cached MD leaf object stored in the unified cache 510. If LA1 is included in a logical address range R1 which does not have a corresponding cached MD leaf object currently stored in the unified cache 510, a read cache miss (with respect to the unified cache 510) is determined and read cache miss processing with respect to the unified cache 510 can be performed.

Such read cache miss processing can include performing a step S1. The step S1 can include using the mapping information of the chain of MD pages mapping LA1 to a corresponding physical address or location PA1 storing content of LA1. It should be noted that sometimes, using the mapping information of the chain of MD pages can be referred to as a default or regular mapper or mapping resolution to obtain the stored content C1 of LA1 from the BE non-volatile storage. The mapping information of the chain of MD pages include a regular MD leaf, LEAF1, having the associated logical address range R1 where R1 includes LA1 of the read I/O. Consistent with other discussion herein, in order to read C1 from the BE non-volatile storage using the mapping information, LEAF1 is read. The mapper resolution processing can stop once the regular MD leaf page LEAF1 of the chain is obtained or read. Following the step S1, a second step S2 is performed.

In the step S2, G1, a corresponding cached MD leaf object 514 for LEAF1 (the corresponding regular MD leaf object of the mapping information), is created and then added to the unified cache 510. Creating the cached MD leaf object G1 can include allocating memory for the object 514. In embodiments using a variable size object 517, the size of G1 allocated can be defined by the size of the encoded LEAF1. In at least one embodiment using a fixed size object 514, the size of G1 can be 4K bytes. The step S2 can include initializing the instance of the newly created object G1. In particular, S2 can include copying information, such as the VLB pointers, from the regular MD leaf LEAF1 to corresponding entries of G1 (denoting the newly allocated MD leaf object). In at least one embodiment, all entries of G1 can include VLB pointers. From the step S2, a third step S3 of read cache miss processing is performed.

In the step S3, an entry E1 of the cached MD leaf object G1 is determined, where E1 corresponds to LA1 of the read I/O operation. E1 of the cached MD leaf object includes a VLB pointer VLB1, where VLB1 can be an indirect pointer used to access C1. In particular VLB1 can be a pointer, address or reference to an entry E2 of a VLB, where E2 of the VLB further includes a PLB pointer PLB 1, where PLB1 is a pointer to, or an address of, the content C1 stored at LA1. Thus, the VLB pointer VLB1 associated with LA1 can be resolved and used to determine the corresponding PLB pointer, PLB1, and also used to read C1 (from BE non-volatile storage). As also discussed elsewhere in, an embodiment can include a VLB cache which can also be used to resolve the VLB pointer and determine the corresponding PLB pointer PLB1. Once the PLB pointer PLB1 is known, in a step S4 following S3, the PLB pointer PLB1 can be stored in the entry E1 of the cached MD leaf object G1. In at least one embodiment using fixed size objects 514, the PLB pointer PLB1 can replace the existing VLB pointer VLB1 of E1.

At this point after performance of the step S4 of read cache miss processing, the newly created and added MD leaf object G1 includes: a PLB pointer for the target logical address, LA1, of the read I/O; and VLB pointers for all other entries of G1 corresponding to other logical addresses in the range R1 associated with the cached MD leaf object G1. Consistent with other discussion below in at least one embodiment of read cache hit processing, the next subsequent access to LA1 (such as with a next read I/O directed to LA1) can result in a cache hit with respect to the object G1 of the unified cache, where the PLB pointer PLB1 of E1 of G1 is accessed and used to directly read the desired content C1 stored at LA1. Thus, the mapper resolution process using the mapping information and traversing the chain of MD pages can be avoid Also consistent with other discussion below in at least one embodiment of read cache hit processing, as a consequence of loading and updating G1 with read cache miss processing noted above, a subsequent read to any other second logical address LA2 also within the range R1 also results in a cache hit with respect to the object G1 of the unified cache. In this case another entry E22 of G1 corresponds to LA2, where E22 contains a VLB pointer VLB2 which can be used as an indirect pointer to access content C2 stored at LA2.

Rather than perform read cache miss processing in connection with the read I/O operation READ1, if LA1 is included in R1 of a cached MD leaf object Y1 currently stored in the unified cache 510, a read cache hit with respect to the unified cache 510 is determined and read cache hit processing with respect to the unified cache 510 can be performed.

Read cache hit processing can include a first step S11 where the corresponding entry E1 of the currently cached MD leaf object Y1 is determined. E1 can correspond to the logical address LA2 in the range R1 associated with the cached MD leaf object Y1. Following the step S11, the step S12 can be performed.

The step S12 of read cache hit processing can include determining whether the pointer of E1 of the cached MD leaf object Y1 has its IS_PLB flag=1 or =0. If the corresponding IS_PLB flag=1, it can denote that the pointer of E1 is a PLB pointer PLB1 which can be used to directly read the content or data C1 from the BE non-volatile storage. Otherwise, if IS_PLB flag=0, it denotes that the pointer of E1 of Y1 is a VLB pointer VLB1 to an entry E2 of a VLB, where E2 of the VLB includes a PLB pointer PLB1 to the content or data C1. Thus, the VLB pointer VLB1 can be used to both determine the PLB pointer PLB1 and also access the content C1. Following the step S12 is the step S13.

In the step S13 of read cache miss processing, the PLB pointer PLB1 is used to access and read C1. Also the step S13 includes updating the entry E1 of the cached MD leaf objectY1 to store the PLB pointer PLB1.

Based on the foregoing read cache miss processing, on the first or initial access to a logical address LA1 of a particular logical address range R1 associated with a corresponding MD leaf LEAF1, a corresponding MD leaf object is loaded into the unified cache. The cached MD leaf object is updated to include a PLB pointer in a corresponding entry for the target logical address LA1. The cached MD leaf object can also include VLB pointers in other entries of the cached MD leaf object. Subsequent accesses, such as subsequent read I/Os, to logical addresses in R1 result in cache hits and further updates to corresponding entries of the cached MD leaf object, where such updates include storing PLB pointers in the corresponding entries and where such PLB pointers are used to access content stored at the logical addresses accessed in the subsequent read I/Os.

It should be noted that if a logical address LA2 has no associated content, such as where there has been no content written to LA2, an entry of the cached MD leaf object associated with LA2 can include an invalid pointer as denoted by a stored predefined invalid pointer value, IS_INVALID. Generally, if IS_INVALID is true for a corresponding entry of a cached MD leaf object, regular or default mapper resolution can be performed using the mapping information and chain of MD pages since the cached MD leaf object does not include cached information for a particular logical address associated with the corresponding entry storing the pointer value IS_INVALID.

Effectively, VLB pointers of entries of a cached MD leaf object of the unified cache can be characterized as a first type of shortcut mapping a logical address LA to a corresponding VLB pointer and allowing for a shortcut with respect to the regular mapper resolution using the mapping information and chain of MD pages. The first type of shortcut avoids or bypasses the processing associated with the MD top, mid and leaf traversal of the chain of mapping information used to map LA1 to a physical address or location PA1 on BE non-volatile storage containing content C1 stored at LA1.

Such VLB pointers of entries of the cached MD leaf object can be updated on demand as neighboring logical addresses in the logical address range R1 are accessed or read, such as in connection with read I/Os. The read I/Os can be included in a large read I/O operation, sequential read I/O operations, multiple read I/O operations generally having locality of reference with respect to R1, and/or one or more random I/Os.

In at least one embodiment, the unified cache 510 can be maintained using a least recently used (LRU) policy on a per MD leaf object basis. Put another way, the unified cache 510 maintains an object level of granularity for a corresponding logical address range. In at least one embodiment, a frequency of access and/or recency of access can be recorded for each cached MD leaf object based on the accesses or reads to a particular logical address range R1 associated with each cached MD leaf object. Such an LRU-based policy can be used, for example, in connection with selecting objects for eviction from the unified cache, as may be needed.

In at least one embodiment, multiple logical address ranges R1 and R2 associated with two corresponding cached MD leaf objects O1 and O2 of the unified cache can both hash or map to the same entry or index I of the hash table HT used to implemented the unified cache. In such an embodiment, each entry or index I of the HT can be associated with a list of one or more cached MD leaf objects mapping to I. Each cached MD leaf object can further be associated with a unique starting address of the logical address range corresponding to the cached MD leaf object. For example, R1 can having a starting address S1 and R2 can have a starting address S2 which is different from S1. In this case, querying or searching the hash table HT, to determine whether HT has a matching cached MD leaf object for a specified logical address range Rx from starting logical address Sx to an ending logical address Endx, can include: mapping Sx to an associated index I of HT, HT[I]; and then searching the list of cached MD leaf object associated with HT[I] for a matching cached MD leaf object, MATCH1, where MATCH1 has an associated logical address range with a starting offset matching Sx. If such a matching cached MD leaf object is found, a read cache hit with respect to the unified cache can be determined; and otherwise a read cache miss with respect to the unified cache can be determined.

Figure 7B:
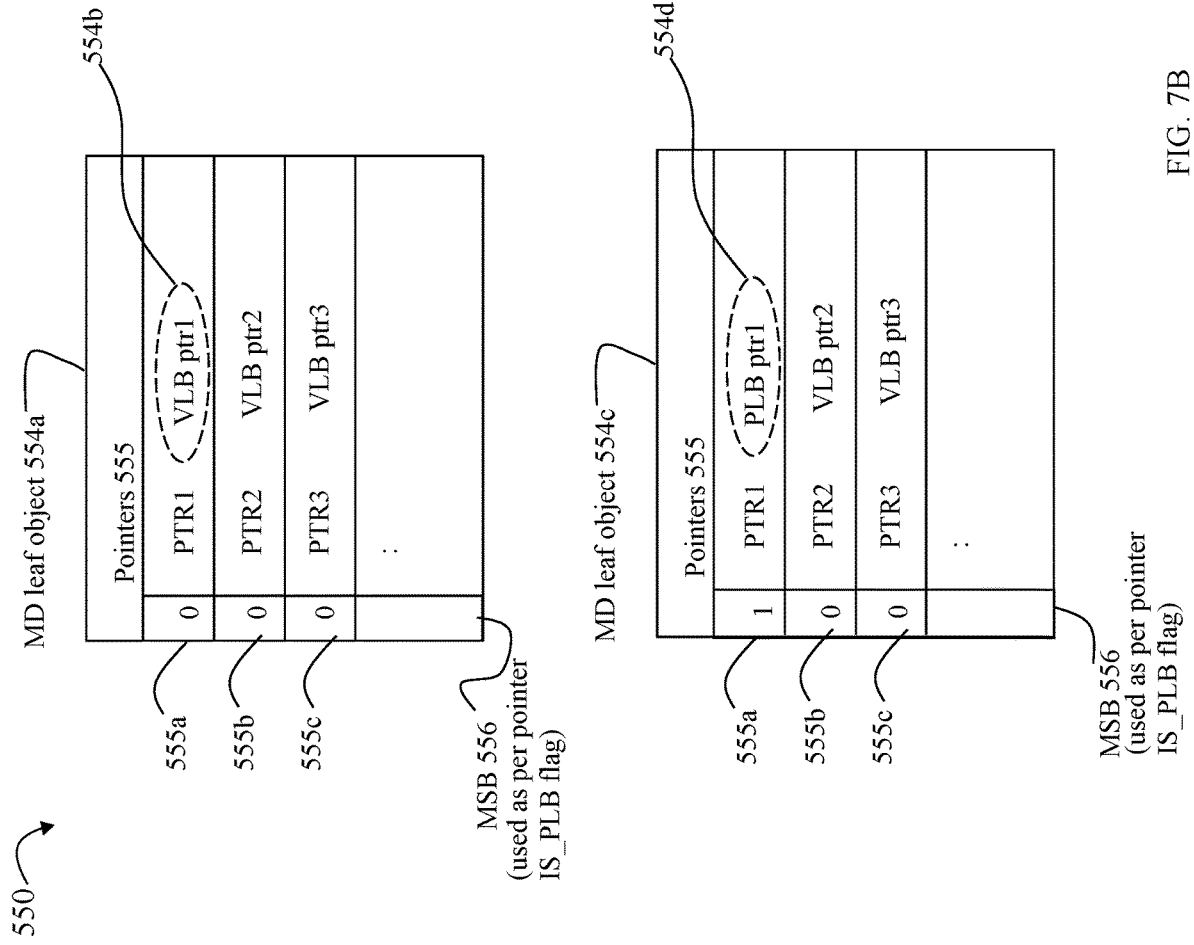

Referring to FIG. 7B, shown is an example 550 illustrating in further detail processing that can be performed in at least one embodiment in accordance with the techniques of the present disclosure.

Assume read cache miss processing is triggered and performed as described above in connection with a read cache miss with respect to the unified cache 510. Assume that the read I/O operation, READ1, reading content C1 from the logical address LA1 results in a read cache miss with respect to a cached MD leaf object of the unified cache. As a result read cache miss processing described herein can be performed which includes reading a regular MD leaf LEAF1 having an associated logical address range R1 with a starting logical address S1 and ending logical address Send, allocating MD leaf object 554a, and updating entries of object 554a with corresponding entries of the regular MD leaf LEAF1. The MD leaf object 554a can denote the state of the cached MD leaf object 554a at a first point in time Tl after updating with corresponding entries of the regular MD leaf LEAF1. In this case, assume all logical addresses in R1 have been written to so that all entries of LEAF1 and the cached MD leaf object include VLB pointers. Thus, the cached object 554a of the unified cache can include all VLB pointers 555 as denoted by corresponding per pointer IS-PLB flags of the entries 555a-c (e.g., all 0 values for MSB 556 of all pointers 555).

Assume that LA1 maps to, or is associated with, the first entry 555a. In this case, read cache miss processing can further include using VLB ptr1 554b to read the content C1 stored at LA1. In particular, VLB ptr1 554b can be a pointer to, or an address of, a VLB entry of a VLB which contains PLB ptr1, the pointer to, or address of, a physical storage location in a PLB storing the desired content C1 of LA1. Thus, PLB ptr1 can be used to first read PLB ptr1, and then PLB ptr1 can be used to read C1. Subsequently, at a second point in time, the MD leaf object 554a can be updated to be as denoted by 554c, where the VLB ptr1 554b of entry 554a is replaced with the corresponding PLB pointer, PLB ptr1 554d. Additionally, read cache miss processing can also include updating the MSB 556 of entry 55a from 0 (as in 554a) to 1 (as in 555a) to denote that the pointer of entry 555a is a PLB pointer (rather than a VLB pointer).

In at least one embodiment, additional caches can be used in addition to the unified cache 510. An embodiment can also maintain and utilize a metadata (MD) cache for storing other metadata pages besides regular MD leaf pages. For example, such a MD cache can be used to store MD top, mid and/or VLB pages such as discussed elsewhere (e.g., FIGS. 3-6). In at least one embodiment, the MD cache is not used to cache regular MD leaf pages. Thus, regular MD leaf pages may not be cached and rather cached MD leaf objects of the unified cache can be utilized. In some associated I/O workflows, the unified cache can be utilized and may contain the needed information. Otherwise, if an associated workflow uses additional MD leaf information which is included in a regular MD leaf but not in a corresponding instance of a cached MD leaf object of the unified cache, the workflow can perform its processing without using the unified cache and by reading a persistently stored copy of the regular MD leaf, such as from BE non-volatile storage.

Figure 7C:
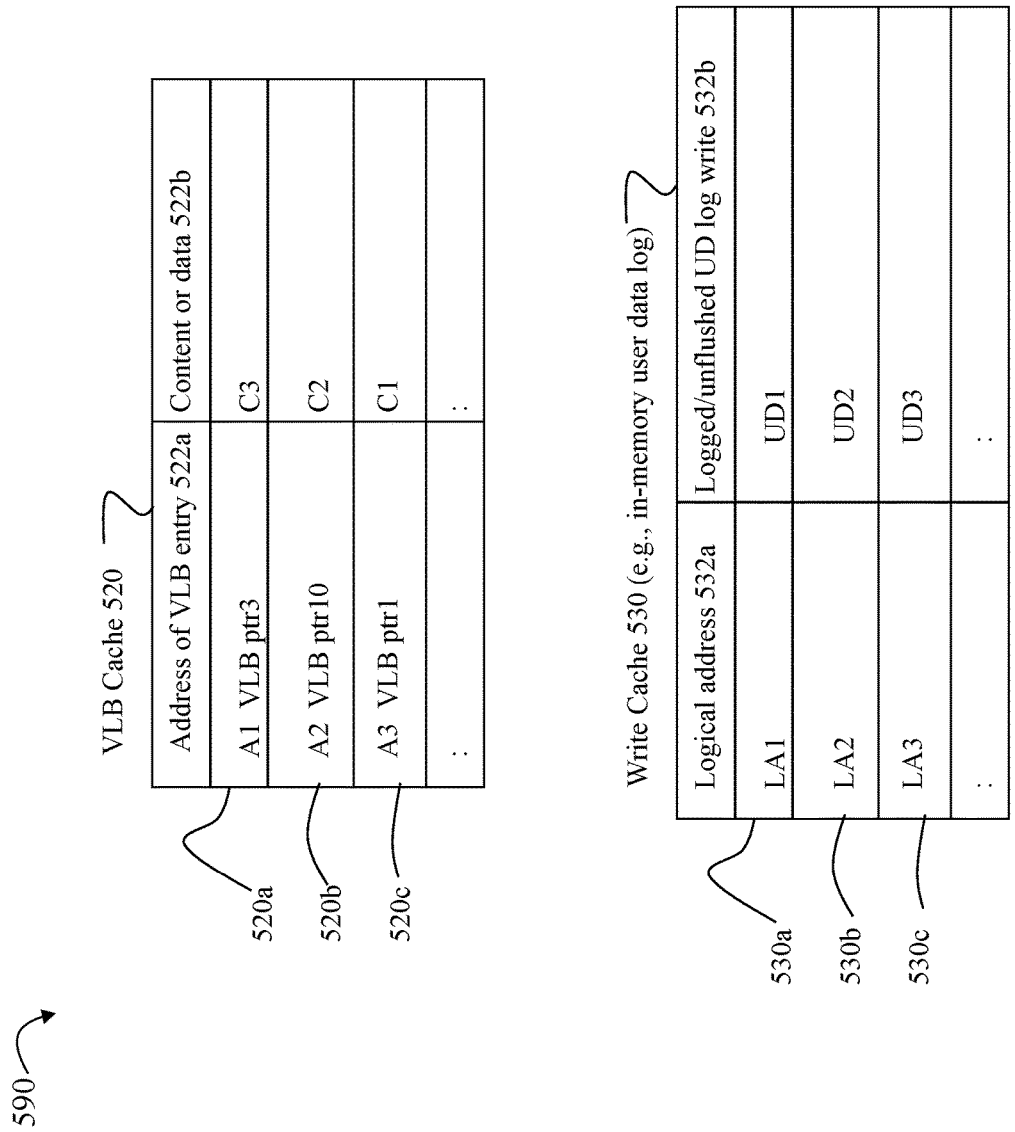

Referring to FIG. 7C, shown is an example 590 of two additional caches that can be used in at least one embodiment in accordance with the techniques of the present disclosure. The example 590 illustrates a VLB cache 520 and a write cache 530 which can be used in at least one embodiment in accordance with the techniques of the present disclosure.

The VLB cache 520 can include entries where each entry of 520 maps a VLB pointer (e.g., an address of, or pointer to, a VLB entry) 522a to content or data 522b stored in the VLB cache. The content or data denoted in the column 522b can be user data or content which is stored at a logical address and cached in the VLB cache. The VLB cache 520 can be organized, indexed and/or accessed by VLB pointer or entry address 522a, whereby the VLB entry addresses, pointers or references can be used as keys to index into the VLB cache 520. Each VLB entry address, pointer or reference can be an address, pointer or reference to a VLB entry of a VLB page (e.g., as in connection with FIGS. 4-6). Each of the keys (552*a*) of the VLB cache 520 can be a VLB pointer which, as discussed elsewhere herein, can be stored as a pointer in an entry of a regular MD leaf and also an entry of a cached MD leaf object of the unified cache. Logically, the VLB cache can be organized as a key-value store or database (DB) where the VLB entry addresses, pointers or addresses are values used as the "key" and where the returned "value" for the "key" denotes the cache location of the corresponding cached content or data (stored in the VLB cache). The entry 520*a* maps the VLB pointer or entry address VLB ptr3 (522*a*) to its corresponding cached content or data (522*b*), indicating that the VLB pointer or entry address VLB ptr3 (522*a*) references or points to the cached content or data C3 (522*b*). The entry 520*b* maps the VLB pointer or entry address VLB ptr10 (522*a*) to its corresponding cached content or data (522*b*), indicating that the VLB pointer or entry address VLB ptr10 (522*a*) references or points to the cached content or data C2 (522*b*). The entry 520*c* maps the VLB pointer or entry address VLB ptr1 (522*a*) to its corresponding cached content or data (522*b*), indicating that the VLB entry address VLB ptr1 (522*a*) references or points to the cached content or data C1 (522*b*).

The VLB cache 520 does not cache any duplicate cached content or data (e.g., no two entries of 520 include the same cached content or data 522*b*). Put another way, each entry of the VLB cache 520 stores unique content or data which can be referenced by one or more different logical addresses, and thus one or more entries of one or more regular MD leaf structures, and also one or more entries of one or more cached MD leaf objects of the unified cache.

In one aspect, the VLB cache 520 can be characterized as a shortcut used in order to bypass the default mapping information resolution processing described herein which traverses the chain or sequence of mapping information such as described in connection with FIGS. 3-6. The VLB cache 520 can be used in connection with servicing a read I/O operation as discussed in more detail elsewhere herein.

Consistent with discussion above, the VLB cache 520 can include entries, where each entry includes a key 522*a* and associated data or content 522*b* stored in the VLB cache 520. Cached data (522*b*) stored in the VLB cache 520 is indexed, accessed and organized using keys (522*a*) associated with the cached data. In at least one embodiment, values of the keys 522*a* can be VLB pointers, references, or addresses used to access the data blocks as stored on a BE PD, where such data blocks include stored user data or content (522*b*). In at least one embodiment, each key 522*a* can be VLB pointer or address used to indirectly access the data block on a BE PD. In at least one embodiment, the key 522*a* for a data block stored in the VLB cache 520 can be the VLB pointer to, or address of, an entry in a VLB node, page or structure of the mapping information (e.g., MD mapping a logical address to its corresponding content as persisted on a BE PD), where the VLB entry includes the reference count for the data block and where the VLB entry includes the address of, or pointer to, the data block. Thus, in such an embodiment, the values used for the keys 522*a* of the VLB cache 522 can correspond to entries of a cached MD leaf object of the unified cache. For example, reference is made to the cached MD leaf object 554*a* of FIG. 7B. In particular, the entry 555*a* of the cached MD leaf object 554*a* of the unified cache includes the VLB pointer VLB ptr1 which can be used as a key to index into the VLB cache 520 to read the corresponding entry 520*c* of the VLB cache 520, where the entry 520*c* is associated with the cached content C1 (522*b*) stored at the logical address LA1 noted above. In at least one embodiment, the VLB cache 520 can be used in combination with the unified cache 510. In particular, in connection with read flow I/O processing discussed herein, a VLB pointer as stored in an entry E1 of an object of the unified cache 510 can be used with the VLB cache 520 to directly access content or data (522*b*) stored at a logical address corresponding to E1. In such an embodiment, the VLB cache 520 can be used to directly access user data or content from cache rather than use the VLB pointer to indirectly access and read the user data or content from BE non-volatile storage (e.g., VLB pointer used to access and read PLB pointer of a VLB entry, where the PLB pointer is then used to access and read the user data or content from a physical address or location in BE non-volatile storage). In the event that a corresponding entry is not found in the VLB cache 520 for a particular VLB pointer, then other processing noted above to resolve the VLB pointer (e.g., VLB pointer used to access and read PLB pointer of a VLB entry of a VLB structure or page, where the PLB pointer is then used to access and read the user data or content from a physical address or location in BE non-volatile storage).

The write cache 530 can denote an in-memory copy of the user data (UD) log of recorded writes or updates which have not yet been flushed from the UD log, where such recorded writes or updates are indexed by logical address (denoting the target logical addresses of the writes or updates of stored user data or content). The UD log is described generally elsewhere herein, such as, for example, in connection with FIGS. 2B, 2C and 2D. Consistent with other discussion herein, the UD log can be stored persistently and can also be stored in volatile memory using a logical organization as denoted by the write cache 530. The write cache 530 can be represented by the entries of 530, where each entry of 530 maps a logical address 532*a* to a recorded write or update of a user data 522*b* stored in the write cache. The recorded writes or updates in 532 can be in-memory copies of writes or updates a recorded in the persistently stored entries of the UD log.

The logged or unflushed UD log write denoted in the column 532*b* can be cached in the write cache. The write cache 530 can be organized, indexed and/or accessed by logical address 532*a*, whereby the logical addresses (532*a*) can be used as keys to index into the write cache 530 to obtain corresponding recorded or logged write I/O operations (532*b*). Logically, the write cache can be organized as a key-value store or database (DB) where the logical addresses (532*a*) are values used as the "key" and where the returned "value" for the "key" denotes the cache location of the corresponding logged or recorded unflushed UD log write (stored in the write cache). The entry 530*a* maps the logical address LA1 (532*a*) to its corresponding logged write update UD1 (532*b*). The entry 530*b* maps the logical address LA2 (532*a*) to its corresponding logged write update UD2 (532*b*). The entry 530*c* maps the logical address LA3 (532*a*) to its corresponding logged write update UD3 (532*b*).

In at least one embodiment, the write cache 530 can be characterized as a short term cache, and entries or cached content 532*b* of 530 can be cleaned or removed when the corresponding logged UD page (532*b*) is flushed from the UD log. In other words, a logged UD page 532*b* stored in the write cache can exist as a "write cache object" until it is flushed from the UD log.

An embodiment in accordance with the techniques of the present disclosure can also include one or more additional caches than those discussed herein. Also, an embodiment can choose to implement just the unified cache, or the unified cache in combination with one or more of the caches described herein or other suitable caches. For example, in at least one embodiment, a read data cache can be further utilized to cache user data which is read such as in connection with read I/Os. The read data cache can be organized in a manner similar to the write cache 530 where the logical addresses are used as the keys to access cached content, where the cached content is user data or content read.

In at least one embodiment, scenarios arise where logical addresses containing user data or content can be overwritten. Such overwriting can be performed by a subsequent write I/O which writes new content to a logical address LA1, where LA1 currently stores old content from a prior write I/O. In cases where a logical address has its existing content overwritten or otherwise more generally modified or moved in connection with a workflow, the workflow can also perform processing to accordingly either update a cached MD leaf object of the unified cache with a new valid pointer (e.g., either a PLB pointer or VLB pointer) associated with the new content and overwrite. Otherwise, processing can be performed to invalidate any existing entry of the cached MD leaf object for the logical address which is overwritten. To further illustrate, reference is made back to MD leaf object 514 of FIG. 7A. Assume that entry 515a corresponds to the logical address LA1 which is overwritten. Prior to the overwrite, the entry 515a can include a valid pointer for LA1, where the valid pointer is either a PLB pointer or a VLB pointer. Now a write I/O W2 is received which overwrites LA1 with new content NEW. As a result, the pointer value of entry 515a becomes invalid since it is used to reference the old content before W2. As a result, processing can include invalidating the pointer of entry 515a to the predetermined or predefined invalid pointer value, IS_INVALID. Alternatively, processing of the overwrite W2 can update the entry 515a to include either a VLB pointer or a PLB pointer associated with the new content NEW.

As described herein, a metadata log can be used to record writes or updates to various metadata or mapping information such as pages of the hierarchical structure described in connection with FIGS. 3-6. In at least one embodiment the metadata log can be used for recording or logging metadata updates to different types or pages of metadata. In at least one embodiment using the metadata log, destaging recorded MD updates from the metadata log to a persistent storage for a MD page can include: reading an existing copy of the MD page from BE non-volatile storage, generating a current or up to date version of the MD page by applying recorded updates from the metadata log for the MD page to the existing copy, and then persistently storing the current or up to date version of the MD page to BE non-volatile storage. The current or up to date version can replace the prior existing copy of the BE non-volatile storage. In at least one embodiment, both a cached volatile memory copy of the MD log can be maintained as well as a persistent non-volatile memory (NVM) copy of the MD log. The cached or volatile copy of the MD log can have a different organization and structure than the NVM copy of the MD log. In at least one embodiment, the volatile MD log can include an active hash-based bucket (HBSB) structure and an inactive or frozen HBSB. MD updates can be recorded in the active HBSB. Processing can be performed to destage updates from the inactive or frozen HBSB. Roles of the two HBSBs can be switched in an ongoing continuous manner from active to inactive in response to various conditions that can occur. For example, as a first HBSB denoted as the currently active HBSB fills up, it can transition to inactive where its entries are destaged. Also, the currently frozen or second inactive HBSB now transitions to the role of active HBSB where subsequent MD updates are recorded. Destaging recorded MD updates from the MD log can destaged MD updates from the frozen or inactive HBSB but not the active HBSB. In this case, destaging the MD log can include aggregating recorded updates from the inactive HBSB for a MD page, reading an existing copy of the MD page from the BE non-volatile storage, applying those aggregated updates from the inactive HBSB to the existing copy to thereby generate a current up to date copy of the MD page, and storing the current up to date copy of the MD page on the non-volatile BE storage.

In at least one embodiment, the unified cache can be organized as a hash table of cached MD leaf objects. However, the granularity of updating within a cached MD leaf object is at a single logical address, or per entry level. In at least one embodiment, operations with respect to an entry of a cached MD leaf object can be performed using a per logical address lock as opposed to a MD page level lock, control or synchronization technique.

What will now be described with reference to the flowcharts below is further detail regarding processing that can be performed in connection with the unified cache in at least one embodiment in accordance with the techniques of the present disclosure.

Figure 8:
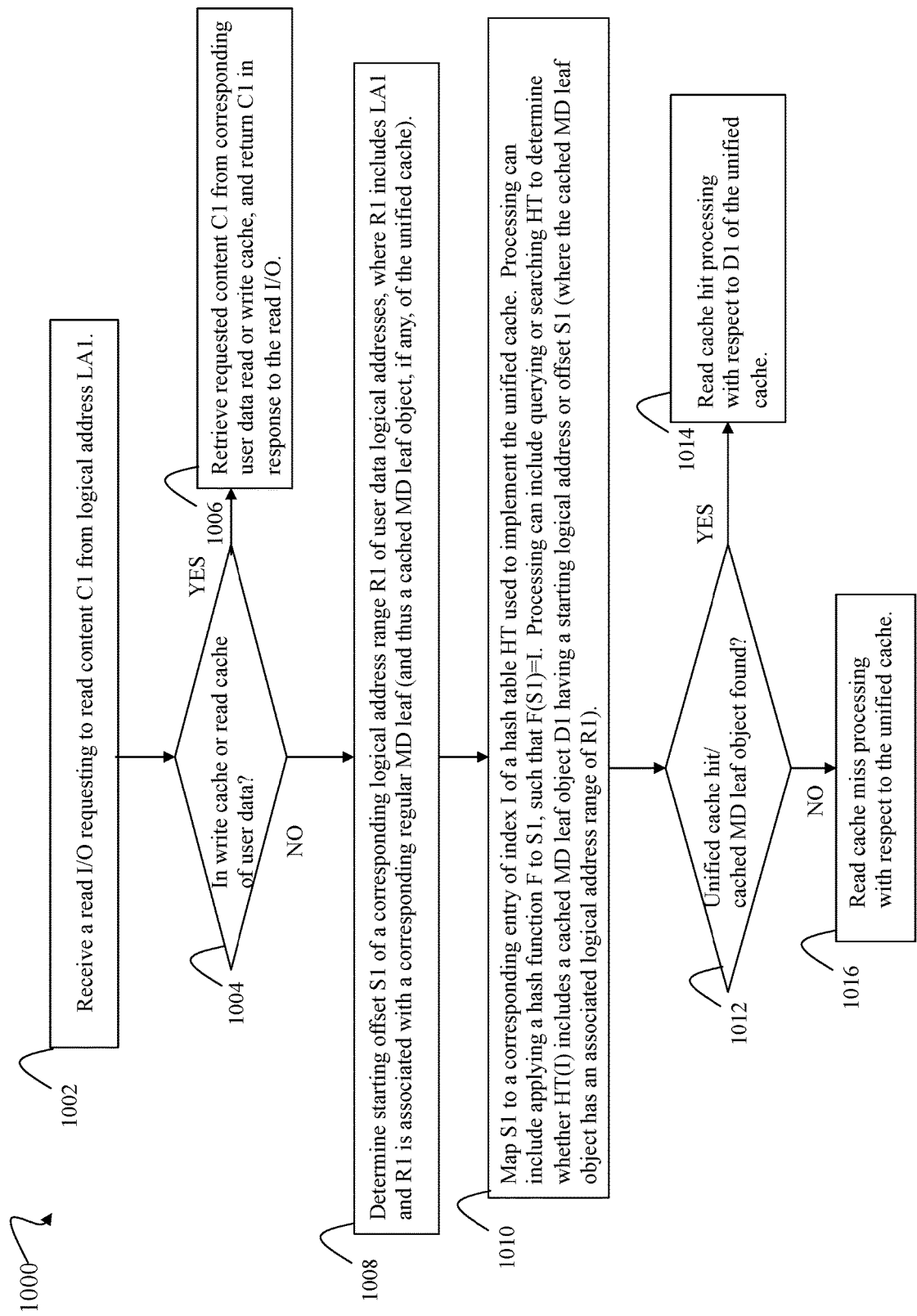
FIGS. 8, 9, 10A and 10B are flowcharts of processing steps that can be performed in at least one embodiment in accordance with the techniques of the present disclosure.

Referring to FIG. 8, shown is a first flowchart 1000 of processing steps that can be performed in at least one embodiment in accordance with the techniques of the present disclosure.

At the step 1002, a read I/O request can be received requesting to read content C1 from the logical address LA1. From the step 1002, control proceeds to the step 1004.

At the step 1004, a determination can be made as to whether requested content of LA1 is stored in a user data cache, such as a write cache of user data or a read cache of user data. In at least one embodiment, such one or more user data caches can be indexed by logical address LA1 to retrieve corresponding content or user data stored at the logical address. If the step 1004 evaluates to yes where the requested content is stored in one of the one or more user data caches, control proceeds to the step 1006. At the step 1006, processing is performed to retrieve the requested content C1 from the corresponding user data read or write cache, and return C1 in response to the read I/O. Otherwise, if the step 1004 evaluates no, control proceeds to the step 1008.

At the step 1008, processing is performed to determine starting offset S1 of a corresponding logical address range R1 of user data logical addresses, where R1 includes LA1 and R1 is associated with a corresponding regular MD leaf (and thus a cached MD leaf object, if any, of the unified cache). From the step 1008, control proceeds to the step 1010.

At the step 1010, processing is performed to map S1 to a corresponding entry of index I of a hash table HT used to implement the unified cache. Processing of the step 1010 can include applying a hash function F to S1, such that F(S1)=I. Processing of the step 1010 can include querying or searching HT to determine whether HT(I) includes a cached MD leaf object D1 having a starting logical address or offset S1 (where the cached MD leaf object has an associated logical address range of R1). From the step 1010, control proceeds to the step 1012.

At the step 1012, a determination is made as to whether there is a unified cache hit where the unified cache includes a cached MD leaf object having starting address S1 of its associated range R1. If the step 1012, evaluates to yes, control proceeds to the step 1014 where read cache hit processing is performed with respect to D1 of the unified cache. Otherwise, if the step 1012 evaluates to no, control proceeds to the step 1016 where read cache miss processing is performed with respect to the unified cache. Subsequent figures and description provide further details regarding the steps 1014 and 1016.

Figure 9:
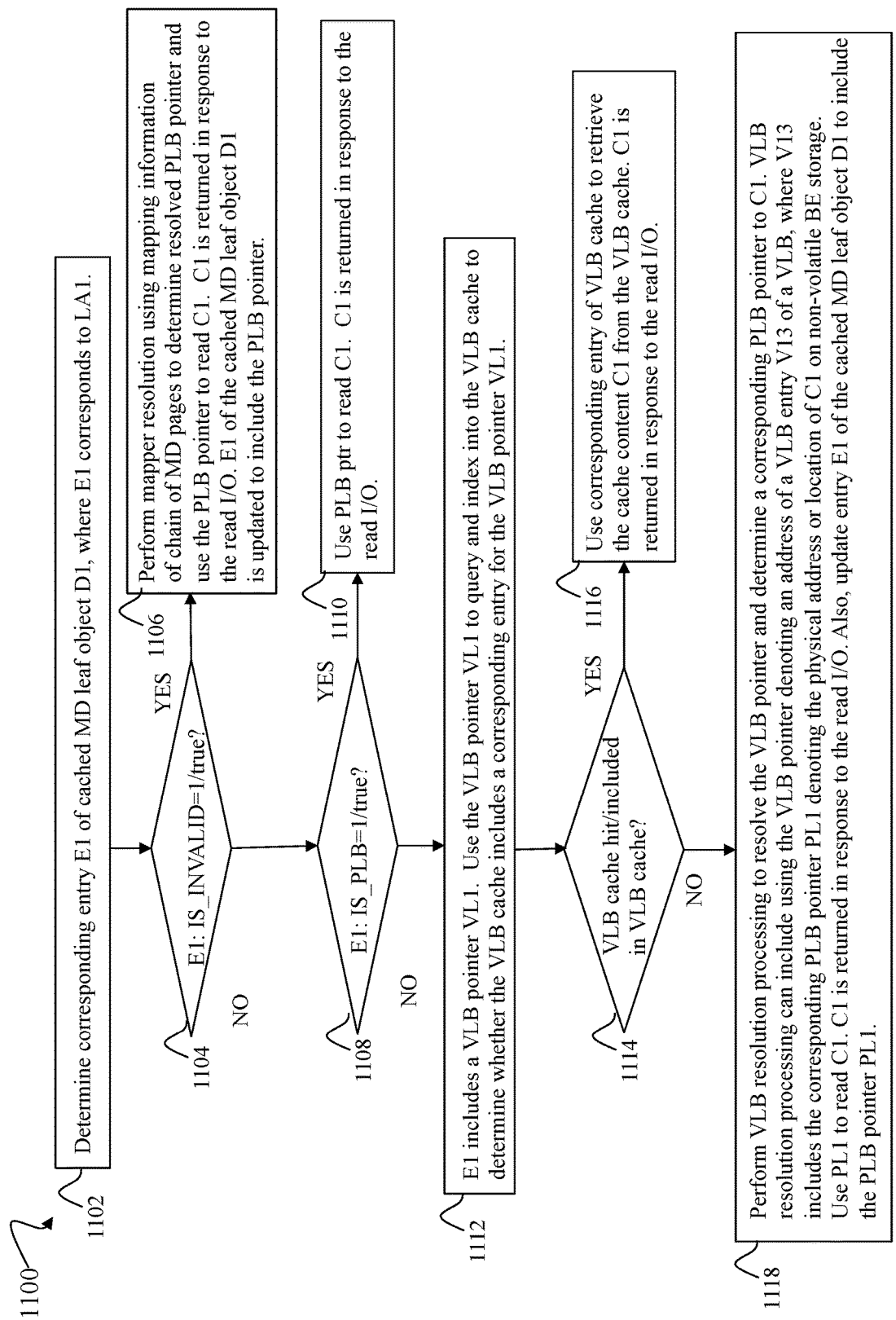

Referring to FIG. 9, shown is a flowchart 1100 of processing steps that can be performed in connection with reach cache hit processing with respect to the unified cache. The flowchart 1100 provides further detail regarding the step 1014 of FIG. 8.

At the step 1102, processing is performed to determine a corresponding entry E1 of cached MD leaf object D1, where E1 corresponds to LA1. From the step 1102, control proceeds to the step 1104.

At the step 1104, a determination is made as to whether E1 includes an invalid pointer whereby IS_INVALID is true for E1. If the step 1104 evaluates to yes, control proceeds to the step 1106. At the step 1106, mapper resolution is performed using mapping information of the chain of MD pages to determine a resolved PLB pointer and then use the PLB pointer to read C1. C1 is returned in response to the read I/O. The entry E1 of the cached MD leaf object D1 is updated to include the PLB pointer. If the step 1104 evaluates to no, control proceeds to the step 1108.

At the step 1108, a determination is made with respect to the entry E1 of the cached MD leaf object D1 as to whether IS_PLB=1 or is true. If the step 1108 evaluates to yes, then the pointer of E1 is a PLB pointer and control proceeds to the step 1110. In the step 1110, the PLB pointer of E1 is used to read C1, and C1 is then returned in response to the read I/O. If the step 1108 evaluates to no, then the pointer of E1 is a VLB pointer and control proceeds to the step 1112.

At the step 1112, E1 includes a VLB pointer VL1. Processing is performed to use the VLB pointer VL1 to query or index into the VLB cache to determine whether the VLB cache include a corresponding entry for the VLB pointer VL1. From the step 1112, control proceeds to the step 1114.

At the step 1114, processing is performed to determine whether the query of the VLB cache from the step 1112 indicates a VLB cache hit where the VLB cache includes a corresponding entry for the VLB pointer VL1. If the step 1114 evaluates to yes indicating a VLB cache hit, control proceeds to the step 1116. At the step 1116, the corresponding entry of the VLB cache is used to retrieve the cached content C1 from the VLB cache (where C1 is associated with the corresponding entry for VL1). C1 is then returned in response to the read I/O. Otherwise if the step 114 evaluates to no indicating a VLB cache miss, control proceeds to the step 1118.

At the step 1118, VLB resolution processing is performed to resolve the VLB pointer and determine a corresponding PLB pointer to C1. VLB resolution processing can include using the VLB pointer denoting an address of a VLB entry V13 of a VLB, where V13 includes the corresponding PLB pointer PL1 denoting the physical address or location of C1 on non-volatile BE storage. PL1 can then be used to read C1 where C1 is returned in response to the read I/O. The step 1118 also includes updating the entry E1 of the cached MD leaf object D1 to include the PLB pointer PL1.

Figure 10A:
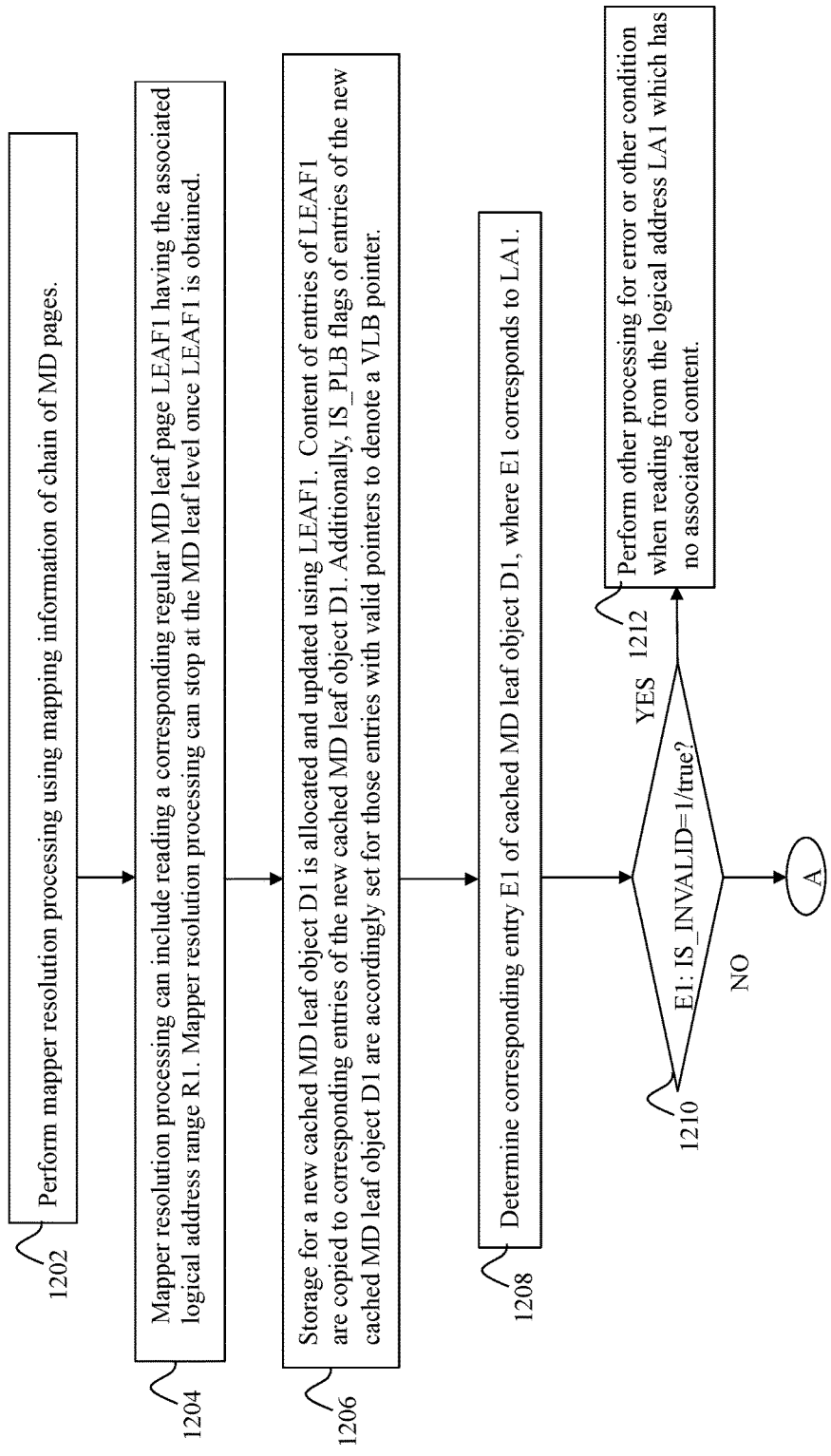
Figure 10B:
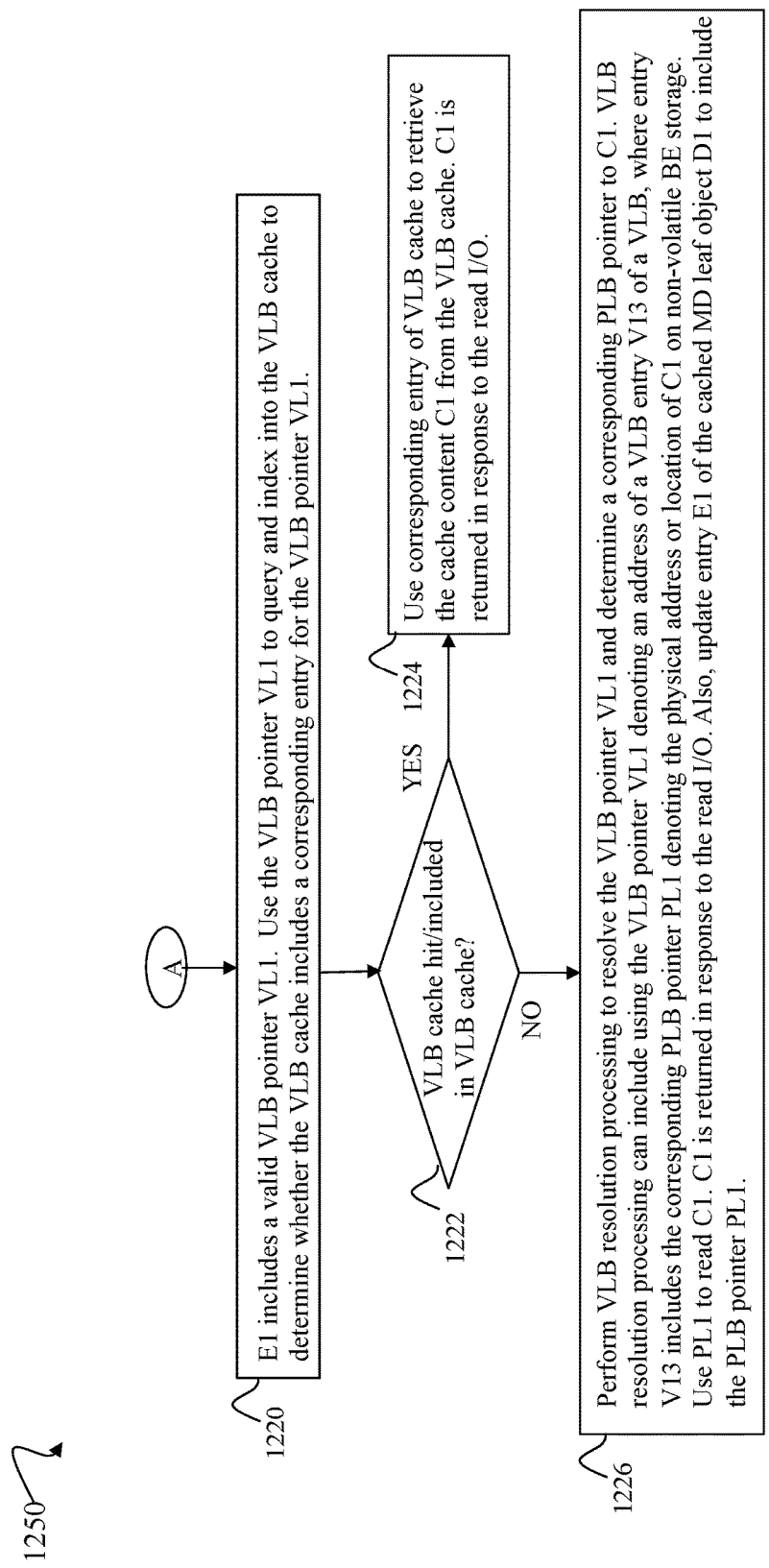

Referring to FIGS. 10A-10B, shown is a flowchart 1200, 1250 of processing steps that can be performed in connection with reach cache miss processing with respect to the unified cache. The flowchart 1200, 1250 provides further detail regarding the step 1016 of FIG. 8.

At the step 1202, mapper resolution processing is performed using mapping information of the chain of MD pages for LA1. From the step 1202, control proceeds to the step 1204 where mapper resolution processing can include reading a corresponding regular MD leaf page LEAF1 having the associated logical address range R1. Mapper resolution processing can stop at the MD leaf level once LEAF1 is obtained. From the step 1204, control proceeds to the step 1206.

At the step 1206, storage for a new cached MD leaf object D1 is allocated and updated using LEAF1. Content of entries of LEAF1 are copied to corresponding entries of the new cached MD leaf object D1. Additionally, IS_PLB flags of entries of the new cached MD leaf object D1 are accordingly set for those entries with valid pointers to denote a VLB pointer. From the step 1206, control proceeds to the step 1208.

At the step 1208, processing can determined a corresponding entry E1 of the cached MD leaf object D1, where E1 corresponds to LA1. From the step 1208, control proceeds to the step 1210.

At the step 1210, a determination can be made as to whether the entry E1 includes an invalid pointer whereby IS_INVALID=1 or true. If the step 1210 evaluates to yes, control proceeds to the step 1212. At the step 1212, other processing for an error or other condition can be performed when reading from the logical address LA1 which has no associated content. If the step 1210 evaluates to no, control proceeds to the step 1220.

At the step 1220, it is determined that E1 includes a valid VLB pointer VL1. The VLB pointer VL1 can be used to query or index into the VLB cache to determine whether the VLB cache includes a corresponding entry for the VLB pointer VL1. From the step 1220, control proceeds to the step 1222.

At the step 1222, a determination is made to whether the VLB cache includes the corresponding entry for the VLB pointer VL1 thereby indicating a VLB cache hit. If the step 1222 evaluates to yes where a VLB cache hit occurs, control proceeds to the step 1224. At the step 1224, the corresponding entry of the VLB cache can be used to retrieve the cached content C1 from the VLB cache. C1 is then returned in response to the read I/O. If the step 1222 evaluates to no, thereby indicating a VLB cache miss, control proceeds to the step 1226.

At the step 1226, VLB resolution processing can be performed to resolve the VLB pointer VL1 and determine a corresponding PLB pointer to C1. VLB resolution processing can include using the VLB pointer VL1 denoting an address of a VLB entry V13 of a VLB, where the VLB entry V13 includes the corresponding PLB pointer PL1 denoting the physical address or location of C1 on non-volatile BE storage. PL1 can be used to read C1 from BE non-volatile storage. C1 is then returned in response to the read I/O. Also, processing of the step 1226 can include updating the entry E1 of the cached MD leaf object D1 to include the PLB pointer PL1.

The techniques herein can be performed by any suitable hardware and/or software. For example, techniques herein can be performed by executing code which is stored on any one or more different forms of computer-readable media, where the code can be executed by one or more processors, for example, such as processors of a computer or other system, an ASIC (application specific integrated circuit), and the like. Computer-readable media can include different forms of volatile (e.g., RAM) and non-volatile (e.g., ROM, flash memory, magnetic or optical disks, or tape) storage which can be removable or non-removable.

While the techniques of the present disclosure have been presented in connection with embodiments shown and described in detail herein, their modifications and improvements thereon will become readily apparent to those skilled in the art. Accordingly, the spirit and scope of the techniques of the present disclosure should be limited only by the following claims.

What is claimed is:

1. A computer-implemented method comprising:
   receiving a read I/O operation requesting first content from a first logical address LA1;
   determining a first logical address range R1 including LA1;
   determining whether a unified cache of metadata (MD) leaf objects includes any cached MD leaf object corresponding to R1; and
   responsive to determining that the unified cache does not include any cached MD leaf object corresponding to R1, determining a unified cache miss with respect to R1 and performing unified cache miss processing including:
      traversing mapping information of a plurality of MD pages, wherein the mapping information is used to map LA1 to a corresponding physical address PA1 storing the first content of LA1, wherein the plurality of MD pages includes a first MD leaf page and wherein said traversing stops at said first MD leaf page;
      creating a first cached MD leaf object corresponding to R1;
      storing indirect pointers from entries of the first MD leaf page to corresponding entries of the first cached MD leaf object;
      performing first processing using a first indirect pointer of a first entry of the first cached MD leaf object, where the first entry corresponds to LA1, wherein said first processing includes retrieving the first content of LA1 using the first indirect pointer; and
      responsive to said first processing, returning the first content in response to the read I/O operation.

2. The computer-implemented method of claim 1, wherein R1 has a starting logical address S1, and wherein said determining whether the unified cache of metadata (MD) leaf objects includes any cached MD leaf object corresponding to R1 further includes:
   mapping S1 to a corresponding index or entry I1 of the unified cache; and
   determining whether the corresponding index or entry I1 of the unified cache is associated with any cached MD leaf object corresponding to R1.

3. The computer-implemented method of claim 2, wherein said mapping includes applying a hash function H to S1, where H(S1)=I1.

4. The computer-implemented method of claim 3, wherein the unified cache is implemented as a hash table using starting logical addresses of corresponding logical address ranges of cached MD leaf objects as keys, and wherein each of the keys associated with one of the corresponding logical address ranges is mapped to a corresponding cached MD leaf object including entries associated with said one corresponding logical address range.

5. The computer-implemented method of claim 1, wherein said first processing includes using a second cache, wherein the second cache uses indirect pointers as keys which are mapped to corresponding content stored at logical addresses.

6. The computer-implemented method of claim 5, wherein said first processing includes:
   querying the second cache using the first indirect pointer as a key or index to determine whether the second cache includes a second entry corresponding to the first indirect pointer; and
   responsive to determining that the second cache includes a second entry corresponding to the first indirect pointer, retrieving the first content associated with the second entry of the second cache.

7. The computer-implemented method of claim 6, wherein said first processing includes:
   responsive to determining that the second cache does not include any entry corresponding to the first indirect pointer, determining a second cache miss and performing second cache miss processing comprising:
      performing first resolution processing using the first indirect pointer to obtain PA1;
      retrieving the first content from PA1; and
      updating the first entry of the first cached MD leaf object to include PA1.

8. The computer-implemented method of claim 7, wherein the first indirect pointer is an address of a virtual layer block (VLB) entry of a VLB structure, wherein the VLB entry includes PA1, and wherein the first resolution processing includes:
   using the first indirect pointer to read the VLB entry including PA1.

9. The computer-implemented method of claim 7, wherein said updating the first entry of the first cached MD leaf object to include PA1 further includes:
   setting a flag associated with the first entry to denote a pointer type indicating a physical address or location of content or user data stored on backend non-volatile storage.

10. The computer-implemented method of claim 1, wherein said storing indirect pointers from entries of the first MD leaf page to corresponding entries of the first cached MD leaf object includes:
    setting flags corresponding to entries of the first cache MD leaf object to denote a pointer type indicating an indirect pointer to content or user data stored on backend non-volatile storage.

11. The computer-implemented method of claim 1, further comprising:
    receiving a second read I/O operation requesting second content from a second logical address LA2;
    determining R1 includes LA2;
    determining that the unified cache includes the first MD leaf object corresponding to R1;
    responsive to determining that the unified cache includes the first MD leaf object corresponding to R1, determining a unified cache hit with respect to R1 and performing unified cache hit processing including:
       determining that the first MD leaf object of the unified cache includes a second entry corresponding to LA2;
       using a second indirect pointer of the second entry of the first MD leaf object to obtain the second content; and
       returning the second content in response to the second read I/O operation.

12. The computer-implemented method of claim 11, wherein the unified cache hit processing includes:

querying a second cache using the second indirect pointer as a key or index to determine whether the second cache includes a third entry corresponding to the second indirect pointer; and responsive to determining that the second cache includes the third entry corresponding to the second indirect pointer, retrieving the second content associated with the third entry of the second cache.

13. The computer-implemented method of claim 11, wherein the unified cache hit processing includes:

querying a second cache using the second indirect pointer as a key or index to determine whether the second cache includes any entry corresponding to the second indirect pointer; and responsive to determining that the second cache does not include any entry corresponding to the second indirect pointer, determining a second cache miss and performing second cache miss processing comprising:

performing first resolution processing using the second indirect pointer to obtain a second physical address PA2;

retrieving the second content from PA2; and updating the second entry of the first cached MD leaf object to include PA2.

14. The computer-implemented method of claim 1, wherein the first cached MD leaf object includes a plurality of entries, each of the plurality of entries being uniquely associated with a single logical address in R1.

15. The computer-implemented method of claim 14, wherein each of the plurality of entries includes a pointer or address which is one of a plurality of defined pointer types.

16. The computer-implemented method of claim 15, wherein a particular one of the plurality of defined pointer types associated with said each entry is denoted by a bit setting in a pointer field of said each entry.

17. The computer-implemented method of claim 16, wherein the bit setting is a setting of a most significant bit of the pointer field of said each entry.

18. A system comprising:
one or more processors; and
a memory comprising code stored thereon that, when executed, performs a method comprising:
receiving a read I/O operation requesting first content from a first logical address LA1;
determining a first logical address range R1 including LA1;
determining whether a unified cache of metadata (MD) leaf objects includes any cached MD leaf object corresponding to R1; and
responsive to determining that the unified cache does not include any cached MD leaf object corresponding to R1, determining a unified cache miss with respect to R1 and performing unified cache miss processing including:

traversing mapping information of a plurality of MD pages, wherein the mapping information is used to map LA1 to a corresponding physical address PA1 storing the first content of LA1, wherein the plurality of MD pages includes a first MD leaf page and wherein said traversing stops at said first MD leaf page;
creating a first cached MD leaf object corresponding to R1;
storing indirect pointers from entries of the first MD leaf page to corresponding entries of the first cached MD leaf object;
performing first processing using a first indirect pointer of a first entry of the first cached MD leaf object, where the first entry corresponds to LA1, wherein said first processing includes retrieving the first content of LA1 using the first indirect pointer; and
responsive to said first processing, returning the first content in response to the read I/O operation.

19. A non-transitory computer readable medium comprising code stored thereon that, when executed, performs a method comprising:
receiving a read I/O operation requesting first content from a first logical address LA1;
determining a first logical address range R1 including LA1;
determining whether a unified cache of metadata (MD) leaf objects includes any cached MD leaf object corresponding to R1; and
responsive to determining that the unified cache does not include any cached MD leaf object corresponding to R1, determining a unified cache miss with respect to R1 and performing unified cache miss processing including:
traversing mapping information of a plurality of MD pages, wherein the mapping information is used to map LA1 to a corresponding physical address PA1 storing the first content of LA1, wherein the plurality of MD pages includes a first MD leaf page and wherein said traversing stops at said first MD leaf page;
creating a first cached MD leaf object corresponding to R1;
storing indirect pointers from entries of the first MD leaf page to corresponding entries of the first cached MD leaf object;
performing first processing using a first indirect pointer of a first entry of the first cached MD leaf object, where the first entry corresponds to LA1, wherein said first processing includes retrieving the first content of LA1 using the first indirect pointer, and
responsive to said first processing, returning the first content in response to the read I/O operation.

* * * * *